(12) United States Patent
Lee

(10) Patent No.: US 11,736,792 B2
(45) Date of Patent: Aug. 22, 2023

(54) ELECTRONIC DEVICE INCLUDING PLURALITY OF CAMERAS, AND OPERATION METHOD THEREFOR

(71) Applicant: SAMSUNG ELECTRONICS CO., LTD., Suwon-si (KR)

(72) Inventor: Jaehong Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 240 days.

(21) Appl. No.: 16/954,409

(22) PCT Filed: Dec. 4, 2018

(86) PCT No.: PCT/KR2018/015264
§ 371 (c)(1),
(2) Date: Jun. 16, 2020

(87) PCT Pub. No.: WO2019/124824
PCT Pub. Date: Jun. 27, 2019

(65) Prior Publication Data
US 2021/0084231 A1 Mar. 18, 2021

(30) Foreign Application Priority Data
Dec. 21, 2017 (KR) .................. 10-2017-0177410

(51) Int. Cl.
*H04N 23/63* (2023.01)
*G06F 1/16* (2006.01)
*G06F 3/041* (2006.01)

(52) U.S. Cl.
CPC ......... *H04N 23/632* (2023.01); *G06F 1/1605* (2013.01); *G06F 3/0412* (2013.01); *G06F 3/0416* (2013.01); *G06F 1/1626* (2013.01)

(58) Field of Classification Search
CPC ............ H04N 5/2257; H04N 5/23245; H04N 5/232935; H04N 5/232945;
(Continued)

(56) References Cited

U.S. PATENT DOCUMENTS

2011/0157427 A1 6/2011 Chang
2014/0178027 A1* 6/2014 Lee ...................... H04N 9/8211
386/201
(Continued)

FOREIGN PATENT DOCUMENTS

KR 10-2010-0132739 12/2010
KR 10-2011-0074022 6/2011
(Continued)

OTHER PUBLICATIONS

International Search Report for PCT/KR2018/015264, dated Mar. 14, 2019, 5 pages.
(Continued)

*Primary Examiner* — Yaron Cohen
(74) *Attorney, Agent, or Firm* — Nixon & Vanderhye, P.C.

(57) ABSTRACT

An electronic device according to various embodiments comprises: a first camera; a second camera; a processor that is electrically connected to the first camera and the second camera; a touch screen that is electrically connected to the processor; and a memory that is electrically connected to the processor, wherein the processor may be configured to obtain an initiation command for capturing a first video, to display a plurality of first image frames that are obtained by the first camera onto the touch screen in response to the initiation command for capturing the first video being obtained, to store the first video based on the plurality of first image frames in the memory, to obtain, while capturing the first video, an initiation command for capturing second
(Continued)

video with respect to a first object that is included in one or more image frames of the plurality of first image frames through the touch screen, and to store, while capturing the first video, the second video based on a plurality of second image frames that include a second object corresponding to the first object obtained using the second camera.

19 Claims, 23 Drawing Sheets

(58) Field of Classification Search
CPC .......... H04N 5/232933; H04N 5/2258; H04N 5/23216; H04N 5/772; H04N 5/225; H04M 1/725; G06F 3/0416; G06F 1/1686; G06F 1/1605; G06F 3/04847; G06F 3/0488; G06F 3/0412; G06F 3/04845; G06F 1/1626
See application file for complete search history.

(56) References Cited

U.S. PATENT DOCUMENTS

| 2017/0013179 | A1 | 1/2017 | Kang et al. |
| 2017/0085764 | A1 | 3/2017 | Kim et al. |
| 2018/0196219 | A1 | 7/2018 | O et al. |

FOREIGN PATENT DOCUMENTS

| KR | 10-2011-0088226 | 8/2011 |
| KR | 10-2013-0024160 | 3/2013 |
| KR | 10-2014-0102560 | 8/2014 |
| KR | 10-2017-0002188 | 1/2017 |
| KR | 10-2017-0006559 | 1/2017 |
| KR | 10-2017-0035237 | 3/2017 |

OTHER PUBLICATIONS

Written Opinion of the ISA for PCT/KR2018/015264, dated Mar. 14, 2019, 5 pages.

* cited by examiner

ELECTRONIC DEVICE INCLUDING PLURALITY OF CAMERAS, AND OPERATION METHOD THEREFOR

This application is a U.S. National Stage application under 35 U.S.C. § 371 of an International application filed on Dec. 4, 2018 and assigned application number PCT/KR2018/015264, which claimed the priority of a Korean patent application filed on Dec. 21, 2017 in the Korean Intellectual Property Office and assigned Ser. No. 10-2017-0177410, the entire disclosures of each of which are hereby incorporated by reference.

FIELD

Various embodiments of the present disclosure relate to an electronic device including a plurality of cameras and an operation method thereof.

DESCRIPTION OF RELATED ART

Recently, electronic devices including a plurality of cameras have become widespread. Anelectronic device may include, for example, two modules: a camera module including a wide-angle lens and a camera module including a telephoto lens. The electronic device may obtain a wide-angle image by capturing a wide-range scene around the electronic device by using the wide-angle lens. The electronic device may obtain a telephoto image by capturing a scene relatively far away from the electronic device by using the telephoto lens. The electronic device may obtain an image specialized for a photographing mode by using various camera modules according to a photographing mode. The electronic device may also include a plurality of camera modules of the same type. The electronic device may compare images respectively captured from the plurality of camera modules and obtain a depth image based on a comparison result. The electronic device may obtain a high-quality image by using data from the plurality of cameras. For example, the electronic device may obtain a high-quality image by processing an electronic signal converted from a photodiode included in each of the plurality of cameras.

SUMMARY

When the electronic device captures a scene, a user may desire to capture an enlarged image for at least one of objects included in the captured image. The user may manipulate the electronic device into a wide-angle mode, and the electronic device may capture an image including multiple objects by capturing a scene at a relatively wide photographing angle. During photographing, the user may manipulate the electronic device into a telephoto mode, and in this case, the electronic device may stop photographing in the wide-angle mode and enter the telephoto mode. In the telephoto mode, the electronic device may obtain an enlarged image for a particular object. However, an existing electronic device needs to stop capturing a wide-angle image to obtain the enlarged image for the particular object, causing capturing of the wide-angle image to be stopped during enlarged photographing of the particular object.

According to various embodiments of the present disclosure, there are provided an electronic device and an operation method thereof, in which during capturing of a moving image by using one camera module, when enlarged capturing of a particular portion of the image is requested, a moving image for the particular portion may be captured using another camera module while performing photographing using the one camera module.

According to various embodiments, an electronic device includes a first camera, a second camera, a processor electrically connected to the first camera and the second camera, a touchscreen electrically connected to the processor, and a memory electrically connected to the processor, in which the processor is configured to obtain a start command for first moving-image capturing, to store a first moving image based on a plurality of first image frames obtained using the first camerain the memory while displaying the plurality of first image frames on the touchscreen in response to obtaining of the start command for the first moving-image capturing, to obtain a start command for second moving-image capturing for a first object included in at least one image frame among the plurality of first image frames through the touchscreen, during capturing of the first moving image, and to store in the memory, a second moving image based on a plurality of second image frames including a second object corresponding to the first object during capturing of the first moving image, the plurality of second image frames being obtained using the second camera.

According to various embodiments, an operation method of an electronic device including a first camera and a second camera includes obtaining a start command for first moving-image capturing, storing a first moving image based on a plurality of first image frames obtained using the first camerain a memory of the electronic device, while displaying the plurality of first image frames, in response to obtaining of the start command for the first moving-image capturing, obtaining a start command for second moving-image capturing for a first object included in at least one image frame among the plurality of first image frames, during capturing of the first moving image, and storing in the memory, a second moving image based on a plurality of second image frames including a second object corresponding to the first object during capturing of the first moving image, the plurality of second image frames being obtained using the second camera.

According to various embodiments, an electronic device includes a first camera, a second camera, a processor electrically connected to the first camera and the second camera, a touchscreen electrically connected to the processor, and a memory operatively connected to the processor, in which the processor is configured to obtain a start command for first moving-image capturing, to store a first moving image based on a plurality of first image frames obtained using the first camerain the memory while displaying the plurality of first image frames on the touchscreen, in response to obtaining of the start command for the first moving-image capturing, to store a plurality of second image frames obtained using the second camera in the memory in response to obtaining of the start command for the first moving-image capturing, to select at least some of the plurality of second image frames based on a user input, and to store in the memory, a second moving image based on at least a part of each of the selected at least some image frames.

Various embodiments of the present disclosure may provide an electronic device and an operation method thereof, in which during capturing of a moving image by using one camera module, when enlarged capturing of a particular portion of the image is requested, a moving image for the particular portion may be captured using another camera module while performing photographing using the one camera module. As photographing for the entire scene is not discontinuous, a moving-image file for the entire scene and a moving-image file including an enlarged image for a particular portion in a particular time zone may be generated together.

DETAILED DESCRIPTION OF EXAMPLE EMBODIMENTS

Figure 1:
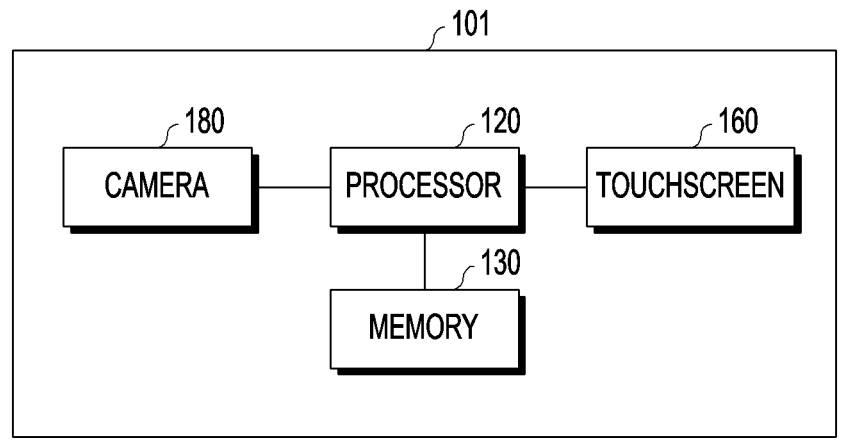
FIG. 1 is a block diagram of an electronic device according to various embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a computer). The machine may invoke stored instructions from the storage medium and operate according to the invoked instructions, and may include an electronic device according to the disclosed embodiments. When the instructions are executed by a processor (for example, the processor), the processor may perform functions corresponding to the instructions. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

FIG. 1 is a block diagram of an electronic device according to various embodiments.

As shown in FIG. 1, an electronic device 101 may include a processor 120, a memory 130, a touchscreen 160, and a camera 180.

The processor 120 may drive, e.g., software to control at least one other component (e.g., a hardware or software component) of the electronic device 101 connected with the processor 120 and may process or compute various data. The processor 120 may load and process a command or data received from another component (e.g., the touchscreen 160, a sensor module (not shown), or a communication module (not shown)) on a volatile memory (e.g., random access memory (RAM)), and the processor 120 may store resultant data in a non-volatile memory (e.g., NAND). According to an embodiment, the processor 120 may include a main processor (e.g., a central processing unit (CPU) or an application processor (AP)) and an auxiliary processor that is operable independently from the main processor. In addition to, or instead of, the main processor 121, the auxiliary processor may include an auxiliary processor (e.g., a graphics processing unit (GPU), an image signal processor, a sensor hub processor, or a communication processor) that consumes less power than the main processor or is specified for a designated function. Here, the auxiliary processor may be operated separately from or embedded in the main processor. That is, a plurality of chips or circuits capable of performing an operation may be included in the electronic device 101.

The auxiliary processor may control at least some of functions or states related to at least one component (e.g., the touchscreen 160, the sensor module (not shown), or the communication module (not shown)) among the components of the electronic device 101, instead of the main processor while the main processor is in an inactive (e.g., sleep) state, or together with the main processor while the main processor is in an active state (e.g., executing an application). According to an embodiment, the auxiliary processor (e.g., an image signal processor or a communication processor) may be implemented as part of another component (e.g., the camera 180 or the communication module (not shown)) functionally related to the auxiliary processor. The memory 130 may store various data used by at least one component (e.g., the processor 120) of the electronic device 101, e.g., software and input data or output data for a command related to the software. The memory 130 may include a volatile and/or nonvolatile memory. According to various embodiments, the memory 130 may store an image captured by the camera 180. The processor 120 may process at least one image captured by the camera 180, compress the image based on various compression schemes, and store the compressed image in the memory 130. The processor 120 may include an image signal processor (ISP) for processing at least one image.

The touchscreen 160 may be a device for visually providing information to the user of the electronic device 101, and may include, e.g., a display and a touch panel mounted together at a position corresponding to the display. According to various embodiments, the electronic device 101 may include a display and an input device that are physically separated from each other, instead of the touchscreen 160. According to an embodiment, the touchscreen 160 may further include a touch circuitry capable of detecting a touch input of the user or a pressure sensor capable of measuring the strength of a pressure with respect to a touch of the user. The electronic device 101 may display an application execution screen, a popup window, an indicator, and various user interfaces (UIs) for user manipulation on the touchscreen 160 or adjust a brightness of the display, in which there is no limitation in a graphic object displayed on the touchscreen 160. For example, the electronic device 101 may display the image captured by the camera 180 on the touchscreen 160. For example, when the electronic device 101 executes a camera application, the electronic device 101 may display at least one image input from the camera 180 in real time on the touchscreen 160, in which the image displayed in real time on the touchscreen 160 may be referred to as a preview image. The electronic device 101 may display an object for capturing an image or a moving image on the preview image and detect designation of the object. Upon detecting designation of the object, the electronic device 101 may store in the memory 130, at least one image related to a point in time at which the object is designated. For example, the electronic device 101 may perform preprocessing with respect to an image to be stored in the memory 130, compress the preprocessed image based on a designated scheme (e.g., a Joint Photographic Experts Group (JPEG) compression scheme, etc.), and store the compressed image in the memory 130. The electronic device 101 may store at least one image frame in the memory 130 based on a moving-image capturing command.

The camera 180 may capture a still image and a moving image. According to an embodiment, the camera 180 may include one or more lenses, an image sensor, an image signal processor, or a flash. The camera 180 may include a three-dimensional (3D) camera that may be implemented with a stereoscopic camera, etc. The processor 120 may identify various information such as position information of the user, a relative position between a plurality of users, a position of an object in an external environment, identification information of the user, information related to a user's state, information related to a user's feedback, etc., by analyzing the image obtained through the camera 180. According to various embodiments, the camera 180 may include a plurality of camera modules. In the present disclosure, a camera module may be referred to as a camera. For example, the camera 180 may include a telephoto camera module and a wide-angle camera module. In this case, the processor 120 may receive an image from each of the two camera modules, and a plurality of interfaces (e.g., mobile industry processor interfaces (MIPIs)) capable of transmitting an image between each of the camera modules and the processor 120 may exist. According to various embodiments, the camera 180 may include a plurality of camera modules of the same type.

According to various embodiments, the processor 120 may store in the memory 130, a plurality of first image frames obtained through a first camera module included in the camera 180 in response to obtaining of a start command for first moving-image capturing. The processor 120 may obtain a start command for second moving-image capturing for an object included in at least one image frame among a plurality of first image frames through the touchscreen 160, while storing the plurality of first image frames. The processor 120 may store in the memory 130, a plurality of second image frames obtained through a second camera module included in the camera 180, while storing the plurality of first image frames. Thus, time information of at least some of the plurality of first image frames constituting a first moving-image file may overlap time information of at least some of the plurality of second image frames constituting a second moving-image file. Moreover, the plurality of second image frames may include a second object corresponding to a subject of a first object included in the plurality of first image frames. For example, while obtaining the plurality of first image frames constituting the first moving-image file through the touchscreen 160, the electronic device 101 may receive a second moving-image capturing command for an object of a "ball" included in at least some of the plurality of first image frames. In this case, the electronic device 101 may store the plurality of second image frames including a second object of the "ball" corresponding to a subject of a real ball in a scene of the object of the "ball" included in at least some of the plurality of first image frames, by using the second camera module. When the viewing angle of the first camera module and the viewing angle of the second camera module are different from each other, the shape of the real ball in the scene may be different from the shape of an object corresponding to "balls" in images captured by the first camera module and the second camera module. Even when the first camera module and the second camera module are the same as each other, arranged positions of the first camera module and the second camera module are different from each other, such that the shape of the real ball in the scene may be different from the shape of the object corresponding to the "balls" in the images captured by the first camera module and the second camera module. According to the foregoing disclosure, the first moving-image file including an image frame captured for a first scene and a second moving-image file including an image frame captured for a subject of at least a part of the first scene may be generated together. Throughout the document, when the electronic device 101 performs a particular process, it may mean that for example, the processor 120 included in the electronic device 101 performs the particular process or control other hardware to perform the particular process. Alternatively, when the electronic device 101 performs the particular process, it may mean that for example, the processor 120 included in the electronic device 101 performs the particular process or control other hardware to perform the particular process, upon execution of at least one command stored in the memory 130 included in the electronic device 101.

Figure 2:
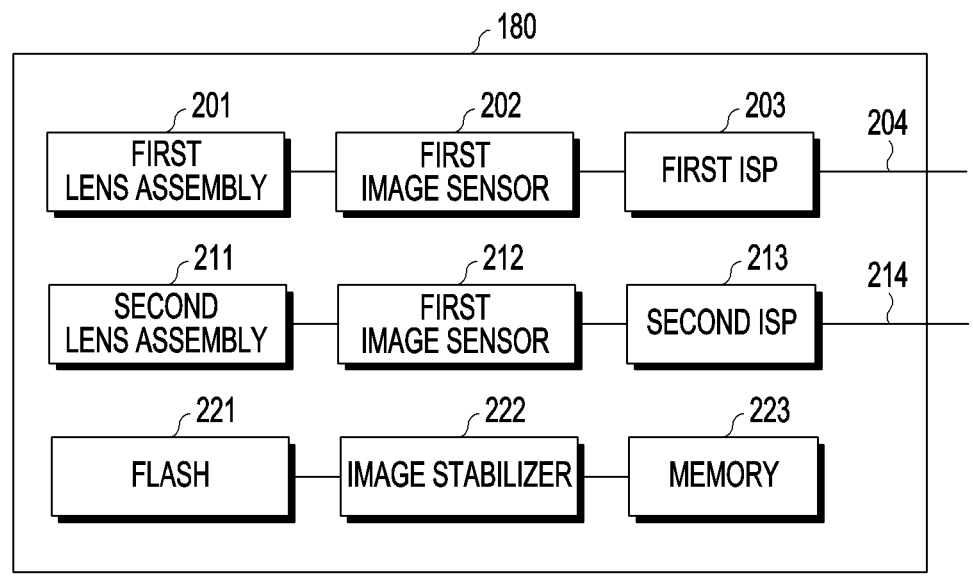
FIG. 2 is a block diagram of a camera according to various embodiments.

FIG. 2 is a block diagram of a camera according to various embodiments. Referring to FIG. 2, the camera 180 may include a first lens assembly 201, a first image sensor 202, a first image signal processor (ISP) 203, a second lens assembly 211, a second image sensor 212, a second ISP 213, a flash 221, an image stabilizer 222, or a memory 223.

The first lens assembly 201 may collect light emitted or reflected from an object whose image is to be taken. The first lens assembly 201 may include one or more lenses. According to an embodiment, the camera 180 may include the second assembly 211. In such a case, the camera 180 may include, for example, a dual camera, a 360-degree camera, or a spherical camera. The plurality of lens assemblies 201 and 211 may have the same lens attribute (e.g., viewing angle, focal length, auto-focusing, f number, or optical zoom), or the first lens assembly 201 and the second lens assembly 211 may have at least one different lens attribute. Each of the first lens assembly 201 and the second lens assembly 211 may include, for example, a wide-angle lens or a telephoto lens.

The flash 221 may emit a light source that is used to reinforce light emitted from an object. The flash 221 may include one or more light emitting diodes (LEDs) (e.g., a red-green-blue (RGB) LED, a white LED, an infrared (IR) LED, or an ultraviolet (UV) LED) or a xenon lamp.

The first image sensor 202 may obtain an image corresponding to a subject by converting light transmitted from the subject via the first lens assembly 201 into an electrical signal. The second image sensor 212 may obtain an image corresponding to a subject by converting light transmitted from the subject via the second lens assembly 211 into an electrical signal. According to an embodiment, the image sensors 202 and 212 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensors 202 and 212 may be implemented with, for example, a charged coupled device (CCD) sensor or a complementary metal oxide semiconductor (CMOS) sensor.

The image stabilizer 222 may move or control (e.g., adjust read-out timing) at least one lens included in the lens assemblies 201 and 211 or the image sensors 202 and 212 to at least partially compensate for a negative influence (e.g., image blurring) of movement of the camera 180 or the electronic device 101 including the same upon a captured image in response to the movement. According to an embodiment, the image stabilizer 222 may be implemented with, for example, an optical image stabilizer, and may sense such a movement using a gyro sensor (not shown) or an acceleration sensor (not shown) disposed inside or outside the camera 180.

The memory 223 may store, at least temporarily, at least part of an image obtained via the image sensors 202 and 212 for a subsequent image processing task. For example, when image capturing is delayed due to shutter lag or multiple images are quickly captured, a raw image obtained (e.g., a high-resolution image) may be stored in the memory 223, and its corresponding copy image (e.g., a low-resolution image) may be previewed via the touchscreen 160. Thereafter, when a specified condition is met (e.g., by a user's input or system command), at least part of the raw image stored in the memory 223 may be obtained and processed, for example, by the image signal processors 203 and 213. According to an embodiment, the memory 223 may be configured as at least part of the memory 223 or as a separate memory that is operated independently from the memory 223.

The image signal processors 203 and 213 may perform image processing (e.g., depth map generation, three-dimensional (3D) modeling, panorama generation, feature point extraction, image synthesizing, or image compensation (e.g., noise reduction, resolution adjustment, brightness adjustment, blurring, sharpening, or softening) on an image obtained by the image sensors 202 and 212 or an image stored in the memory 223. Additionally or alternatively, the image signal processors 203 and 213 may perform control (e.g., exposure time control or read-out timing control) with respect to at least one (e.g., the image sensors 202 and 212) of the components included in the camera 180. An image processed by the image signal processors 203 and 213 may be stored back in the memory 223 for further processing, or may be provided to an external component (e.g., the memory 130 or the touchscreen 160) outside the camera 180. According to an embodiment, the image signal processors 203 and 213 may be connected with an external component through designated interfaces 204 and 214 (e.g., MIPIs). According to an embodiment, the image signal processor 203 and 213 may be implemented as being included in the camera 180, but according to another embodiment, the image signal processors 203 and 213 may be configured as at least a part of the processor 120 or as a separate processor that is operated independently of the processor 120. When the image signal processors 203 and 213 are configured as a separate processor, images processed by the image signal processors 203 and 213 may be stored in the memory 130 or displayed through the display device 160, by the processor 120, as it is or after being further processed.

Figure 3A:
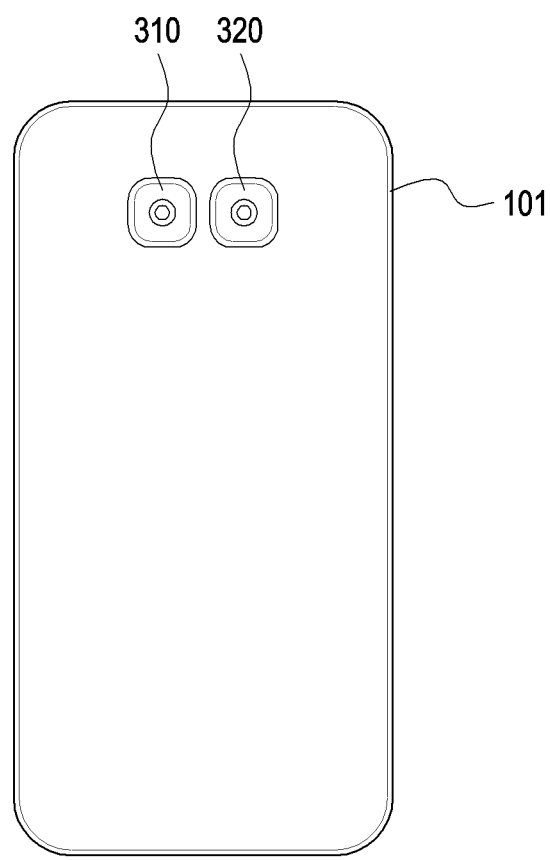
FIG. 3A is a diagram for describing arrangement of a plurality of camera modules according to various embodiments.

FIG. 3A is a diagram for describing arrangement of a plurality of camera modules according to various embodiments.

As shown in FIG. 3A, a first camera module 310 and a second camera module 320 may be located in a back side of the electronic device 101. The first camera module 310 and the second camera module 320 may be located in a horizontal direction at arbitrary intervals, but this is merely an example, such that an interval between the first camera module 310 and the second camera module 320 or the arrangement direction of the first camera module 310 or the second camera module 320 is not limited. For example, the first camera module 310 and the second camera module 320 may be located in the back side of the electronic device 101 in a vertical direction. According to various embodiments, each of the first camera module 310 and the second camera module 320 may include a lens assembly having a different lens attribute. For example, the first camera module 310 may include a wide-angle lens assembly, and the second camera module 320 may include a telephoto lens assembly. According to another embodiment, the first camera module 310 and the second camera module 320 may include lens assemblies having the same lens attributes. In this case, the first camera module 310 and the second camera module 320 may be substantially identical camera modules.

Figure 3B:
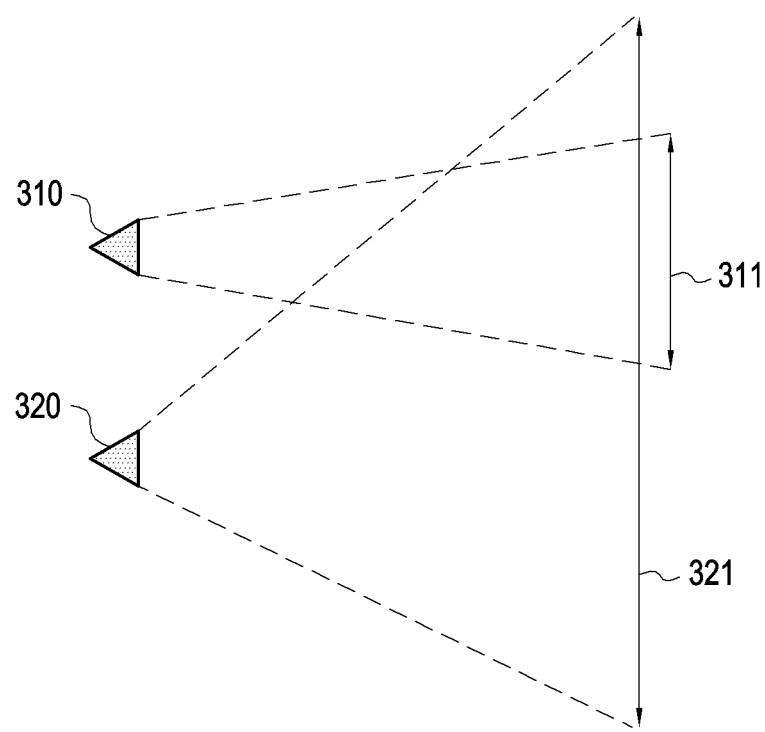
FIG. 3B is a diagram for describing a viewing angle of a camera module according to various embodiments.

FIG. 3B is a diagram for describing a viewing angle of a camera module according to various embodiments.

In an embodiment of FIG. 3B, it is assumed that the first camera module 310 includes a telephoto lens assembly, and the second camera module 320 includes a wide-angle lens assembly. The first camera module 310 may perform photographing at a first viewing angle, and the second camera module 320 may perform photographing at a second viewing angle. As shown in FIG. 3B, the second viewing angle may be greater than the first viewing angle. Thus, for a part far away from the electronic device 101 by a first distance, the first camera module 310 may capture an image for a first part 311 of the entire scene and the second camera module 320 may capture an image for a second part 312 of the entire scene. A first image obtained by the first camera module 310 may reflect the first part 311 of the scene, and a second image obtained by the second camera module 320 may reflect the second part 312 of the scene. When the image obtained by the first camera module 310 and the image obtained by the second camera module 320 have the same size, a size of the first object included in the first image corresponding to a first subject in the scene may be greater than a size of the second object included in the second image corresponding to the first subject in the scene. Meanwhile, the second image may further include objects not included in the first image, in which the object may correspond to subjects that are included in the second part 312 of the scene, but are not included in the first part 311 of the scene. As described above, the first image obtained by the first camera module 310 may be an image enlarged for a relatively small part in the scene, and the second image obtained by the second camera module 320 may be an image reduced for a relatively large part in the scene. That is, the second camera module 320 may be useful to photograph a large view, and the first camera module 310 may be useful for enlarged photographing of a small view. According to various embodiments, the electronic device 101 may obtain an image by using the first camera module 310 in a first photographing mode and obtain an image by using the second camera module 320 in a second photographing mode. The electronic device 101 according to various embodiments may receive a moving-image capturing command for photographing using the first camera module 310 during capturing of a moving image using the second camera module 320. The electronic device 101 may simultaneously perform photographing using the first camera module 310 and photographing using the second camera module 320. Thus, a moving-image file obtained by the second camera module 320 and a moving-image file obtained by the first camera module 310 may be generated, and for example, a length of the moving-image file obtained by the first camera module 310 may be greater than a length of the moving-image file obtained by the second camera module 320. The image obtained by the first camera module 310 may include an object corresponding to a subject of an object included in the image obtained by the second camera module 320.

Figure 4:
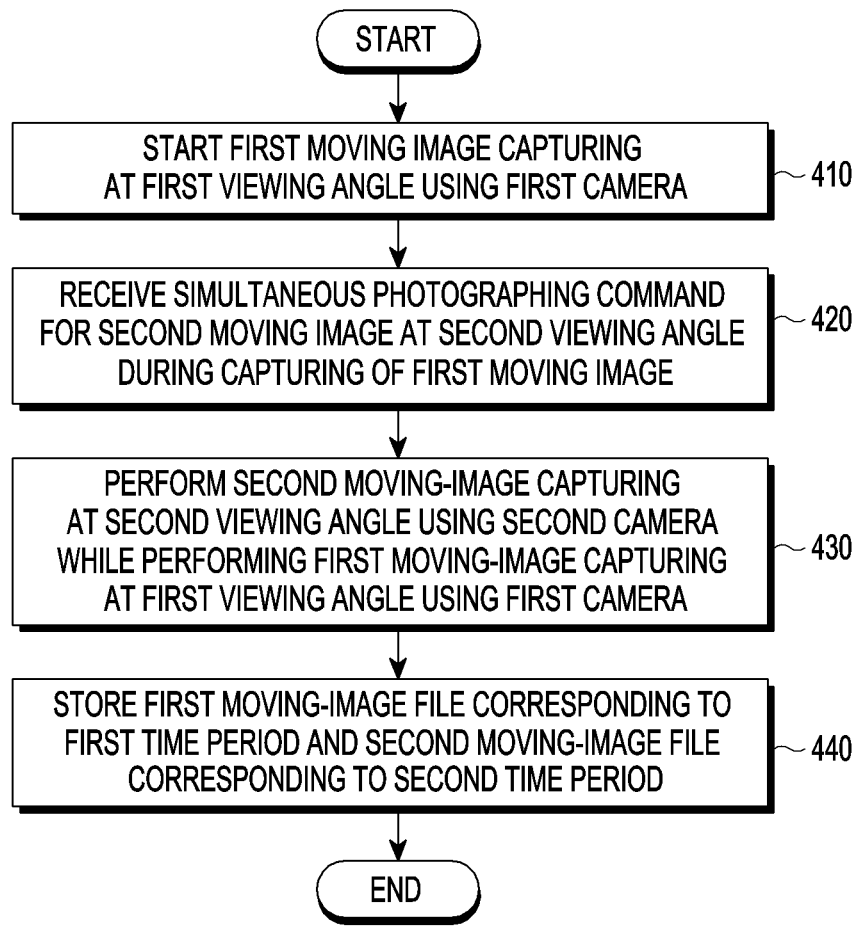
FIG. 4 is a flowchart of an operation method of an electronic device according to various embodiments.
Figure 5A:
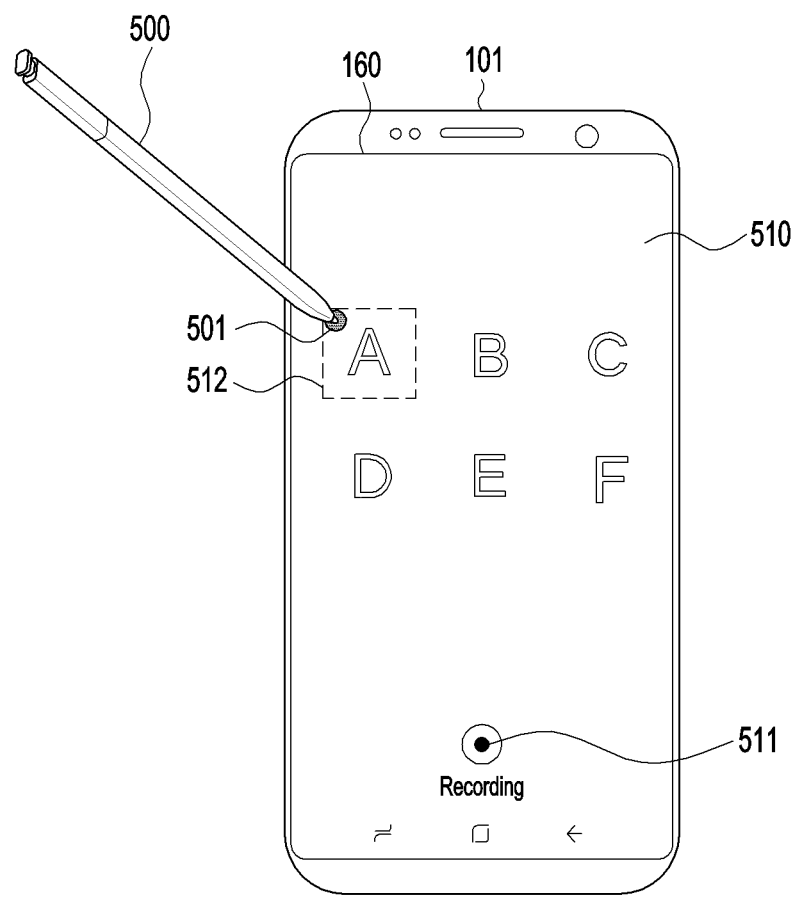
FIG. 5A is a diagram of an electronic device according to various embodiments.
Figure 5B:
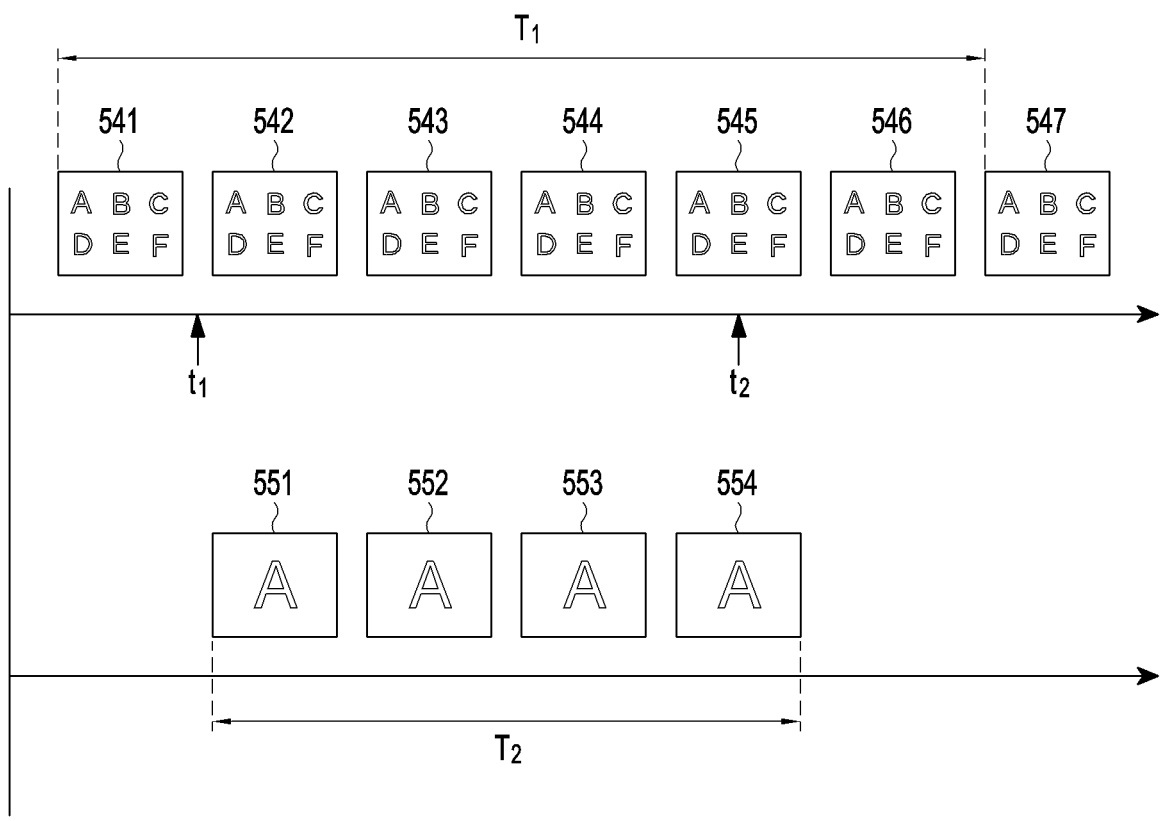
FIG. 5B is a diagram showing images captured by a first camera and a second camera according to various embodiments.

FIG. 4 is a flowchart of an operation method of an electronic device according to various embodiments. The embodiment shown in FIG. 4 will be described in greater detail with reference to FIGS. 5A and 5B. FIG. 5A is a diagram of an electronic device according to various embodiments. FIG. 5B is a diagram showing images captured by a first camera and a second camera according to various embodiments.

Referring to FIG. 4, according to various embodiments, the electronic device 101 may start the first moving-image capturing at the first viewing angle by using a first camera, in operation 410. For example, the electronic device 101 may include the first camera including a wide-angle lens assembly and a second camera including a telephoto lens assembly. The electronic device 101 may obtain a first moving-image capturing command for photographing in a first photographing mode. For example, the electronic device 101 may obtain a camera application execution command. The electronic device 101 may execute the camera application and activate the first camera. The electronic device 101 may display the image obtained by the first camera as a preview image on the touchscreen 160. The electronic device 101 may further display an additional icon (or button) on the preview image. The additional icon may be used to execute various functions supported by the camera application. For example, the electronic device 101 may display an icon for moving-image capturing on the preview image, and start the first moving-image capturing in response to designation of the icon for moving-image capturing. More specifically, the electronic device 101 may store a plurality of first image frames obtained using the first camera in the memory 130. The electronic device 101 may store the plurality of first image frames in the memory 130 after performing at least one of preprocessing, correction, or compression with respect to them. For example, the electronic device 101 may be configured to obtain the preview image by using the first camera and display the preview image, by default, upon execution of the camera application. The electronic device 101 may provide a UI for mode switchover, and may obtain the preview image by using the first camera and display the preview image, upon user's designation of photographing using the first camera.

In operation 420, the electronic device 101 may receive a simultaneous photographing command for capturing of a second moving image at a second viewing angle during the first moving-image capturing. The electronic device 101 may display an icon for simultaneous capturing of the second moving image during the first moving-image capturing, and receive the simultaneous photographing command in response to designation of the icon. The electronic device 101 may detect a touch corresponding to at least a part of a touchscreen and receive the detected touch as the simultaneous photographing command. For example, as shown in FIG. 5A, the electronic device 101 may detect a touch 501 on or proximity to the touchscreen 160 by a stylus pen 500. The electronic device 101 may display an indicator 511 indicating simultaneous photographing while starting the second moving-image capturing on a preview image 510. For example, the electronic device 101 may display a guideline 512 indicating a part corresponding to the second moving image. At least one of a size or a form of the guideline 512 may be adjusted, as will be described in more detail later. According to various embodiments, the electronic device 101 may store the entire image obtained using the second camera as the second moving image or a part of the image obtained using the second camera as the second moving image. For example, the electronic device 101 may store a part of the image obtained using the second camera, which corresponds to the guideline 512, as the second moving image.

In operation 430, the electronic device 101 may perform the second moving-image capturing at the second viewing angle by using the second camera while performing the first moving-image capturing at the first viewing angle by using the first camera. Referring to FIG. 5B, the electronic device 101 may store in the memory 130, a plurality of first images 541, 542, 543, 544, 545, and 546 corresponding to a first photographing period $T_1$ among a plurality of first images 541, 542, 543, 544, 545, 546, and 547 obtained using the first camera. The electronic device 101 may receive a simultaneous photographing command at a first point in time $t_1$. The electronic device 101 may store a plurality of second images 551, 552, 553, and 554 obtained using the second camera in the memory 130, upon receiving the simultaneous photographing command. The plurality of second images 551, 552, 553, and 554 may have, for example, a second photographing period $T_2$. The second images 551, 552, 553, and 554 may include an object corresponding to a part in the guideline 512 designated in FIG. 5A. The electronic device 101 may obtain the plurality of second images 551, 552, 553, and 554 by cropping at least a part of each of images obtained using the second camera. In another embodiment, the electronic device 101 may store all the images obtained using the second camera without cropping the images. In operation 440, the electronic device 101 may store a first moving-image file corresponding to a first time period and a second moving-image file corresponding to a second time period. The electronic device 101 may receive a stop command for the simultaneous photographing at a second point in time $t_2$, and may stop storing an image obtained using the second camera in response to the stop command. Even when the second moving-image capturing is stopped, the electronic device 101 may continue the first moving-image capturing and, upon receiving a stop command for the first moving-image capturing, stop the first moving-image capturing in response to the stop command. The electronic device 101 may stop the second moving-image capturing in response to button designation of a photographing stop command or may stop the second moving-image capturing in response to detection of release of the touch 501 of the stylus pen 500. Through the foregoing process, a moving image having a wide viewing angle and a moving image obtained by enlarging a part of the wide viewing angle may be generated. Meanwhile, storing a plurality of images may mean that the electronic device 101 stores an image obtained by a camera in the memory 130, in which the image may be stored as a raw file or may be stored after being compressed using a designated compression scheme. For example, a moving-image file may be compressed according to various compression formats and then stored in the memory 130.

Figure 6:
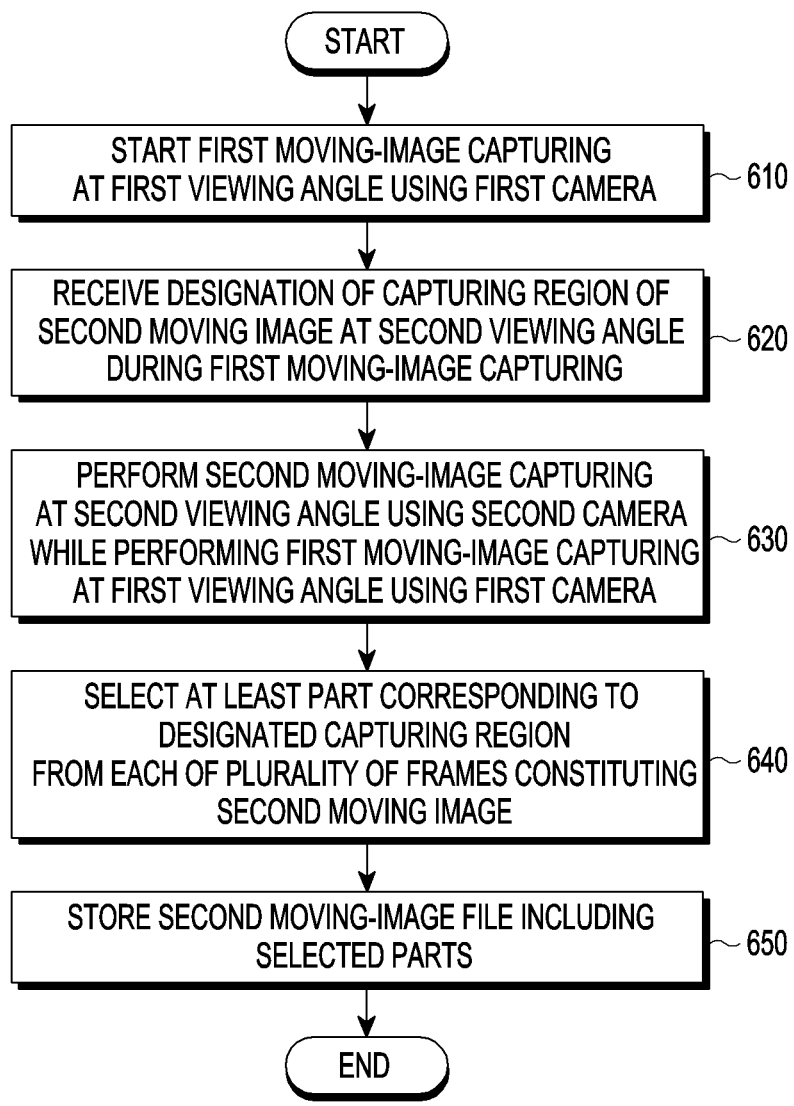
FIG. 6 is a flowchart of an operation method of an electronic device according to various embodiments.

FIG. 6 is a flowchart of an operation method of an electronic device according to various embodiments. The embodiment of FIG. 6 will be described in more detail with reference to FIGS. 7A through 7D. FIGS. 7A through 7D are diagrams of an electronic device according to various embodiments.

Figure 7A:
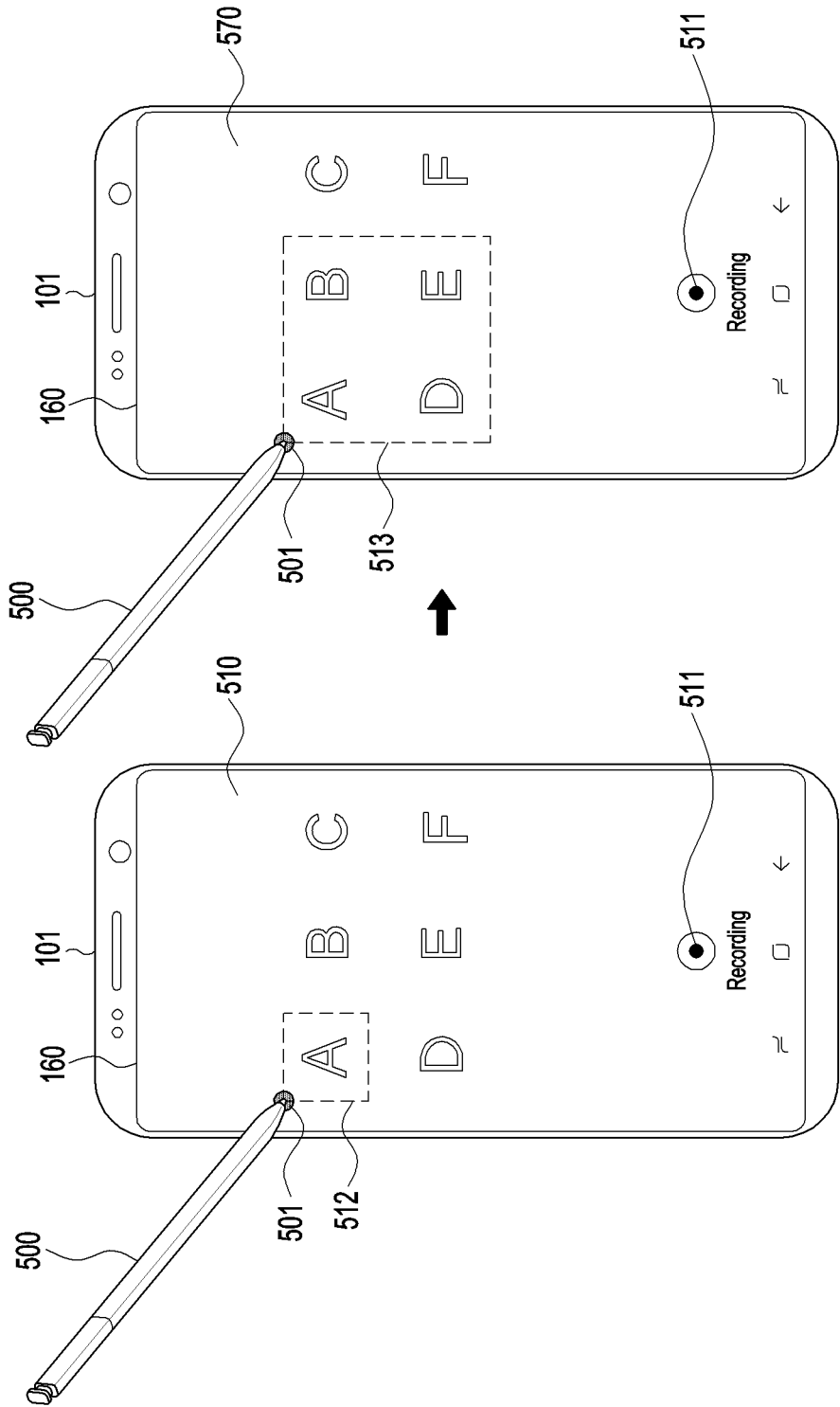
FIGS. 7A, 7B, 7C, and 7D are diagrams of an electronic device according to various embodiments.
Figure 7B:
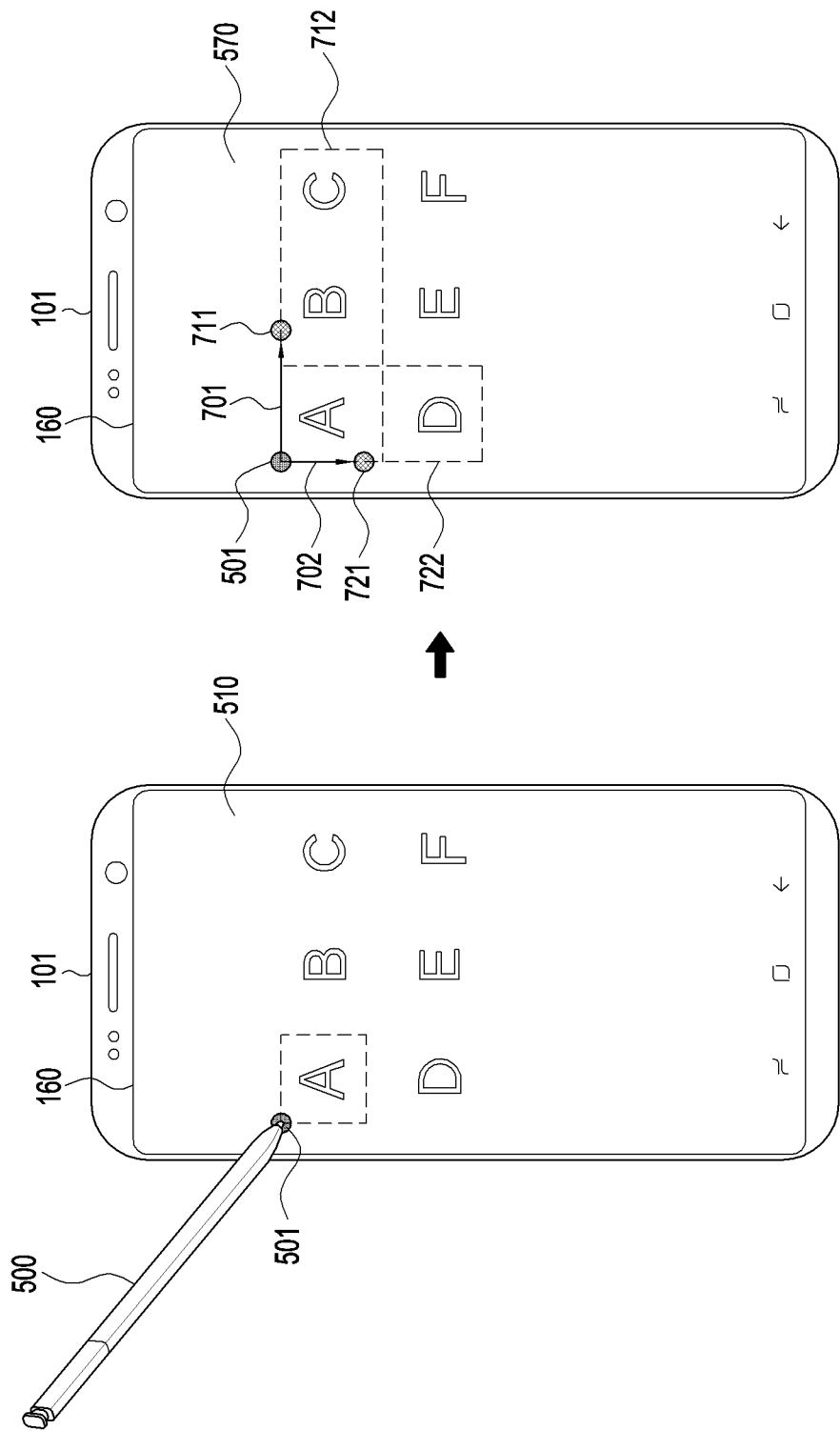
Figure 7C:
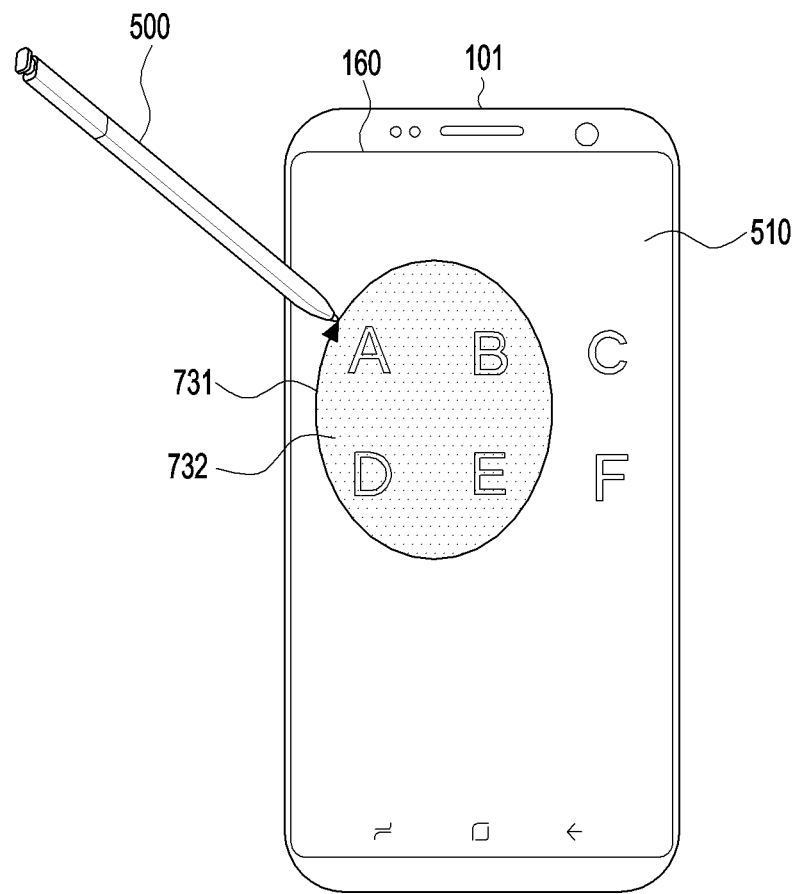

In operation 610, the electronic device 101 according to various embodiments may start the first moving-image capturing at the first viewing angle by using the first camera. In operation 620, the electronic device 101 may receive designation of a capturing region of the second moving image at the second viewing angle during the first moving-image capturing. For example, as shown in FIG. 7A, the electronic device 101 may detect the touch 501 on the touchscreen 160 by the stylus pen 500. Upon detection of the touch 501, the electronic device 101 may provide the guideline 512 of a default size. The electronic device 101 may detect a change in a writing pressure of the touch 501 and enlarge the guideline 512 to a guideline 513 in response to the change in the writing pressure. For example, upon detecting that the writing pressure is greater than or equal to a threshold value, the electronic device 101 may display the enlarged guideline 513 on a preview image 570 as shown in FIG. 7A. Upon detecting that the writing pressure is less than the threshold value, the electronic device 101 may stop a size change of the guideline 513 and receive designation of an inner region of the guideline 513 as the capturing region. As shown in FIG. 7B, the electronic device 101 may detect movement 701 of the touch 501 through the touchscreen 160. For example, the electronic device 101 may detect the touch 501 in a first position at a first point in time, detect the continuous movement 701 of the touch 501, and detect a touch 711 in a second position at a second point in time. The electronic device 101 may display a guideline 712 having a form that is changed based on a direction of the continuous movement 701 of the touch. For example, the electronic device 101 may detect the touch 501 in the first position at the first point in time, detect continuous movement 702 of the touch 501, and detect a touch 721 in a third position at the second point in time. The electronic device 101 may display a guideline 722 having a form that is changed based on a direction of the continuous movement 702 of the touch. Alternatively, as shown in FIG. 7C, the electronic device 101 may detect continuous movement 731 of the touch through the touchscreen 160 and receive designation of an inner region 732 of a boundary made by movement 731 as the capturing region.

Figure 7D:
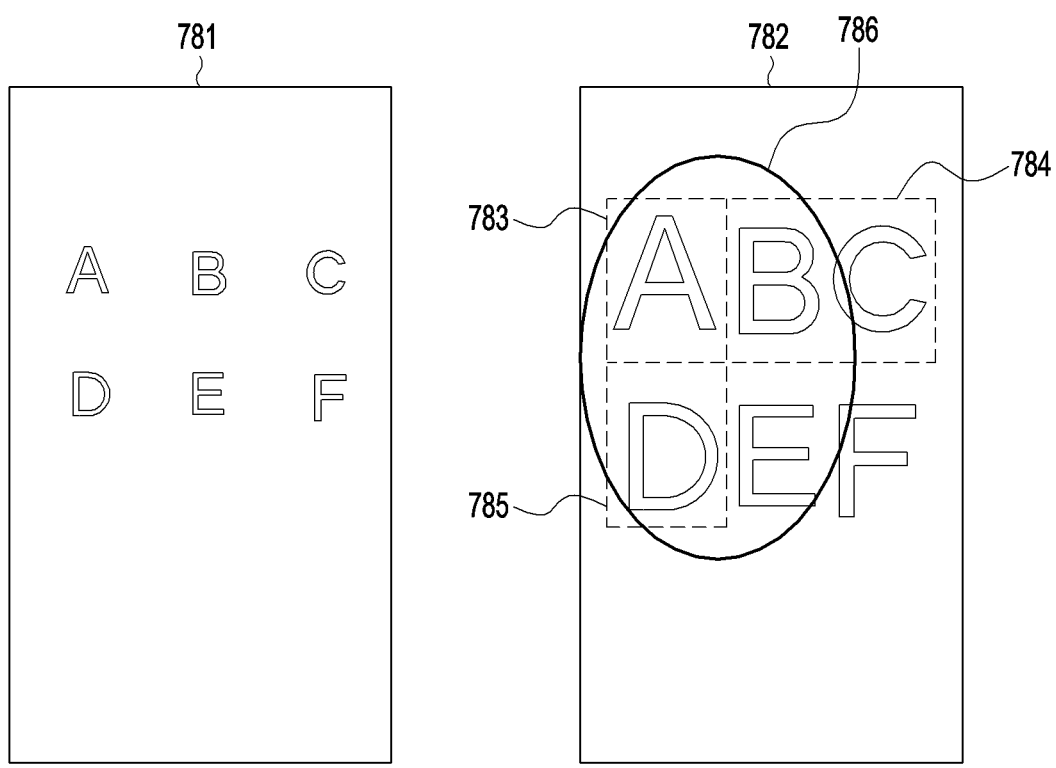

In operation 630, the electronic device 101 may perform the second moving-image capturing at the second viewing angle by using the second camera while performing the first moving-image capturing at the first viewing angle by using the first camera. In operation 640, the electronic device 101 may select at least a part corresponding to the designated capturing region from each of a plurality of frames constituting the second moving image. For example, as shown in FIG. 7D, the electronic device 101 may obtain an image 781 constituting the first moving image through the first camera and an image 782 constituting the second moving image through the second camera. The electronic device 101 may select parts 783, 784, 785, and 786 corresponding to the designated capturing region from the second image during display of the first image 781. According to various embodiments, the electronic device 101 may select the parts 783, 784, 785, and 786 based on a relative position between the first camera and the second camera. In operation 650, the electronic device 101 may store a second moving-image file based on the selected parts.

Figure 8:
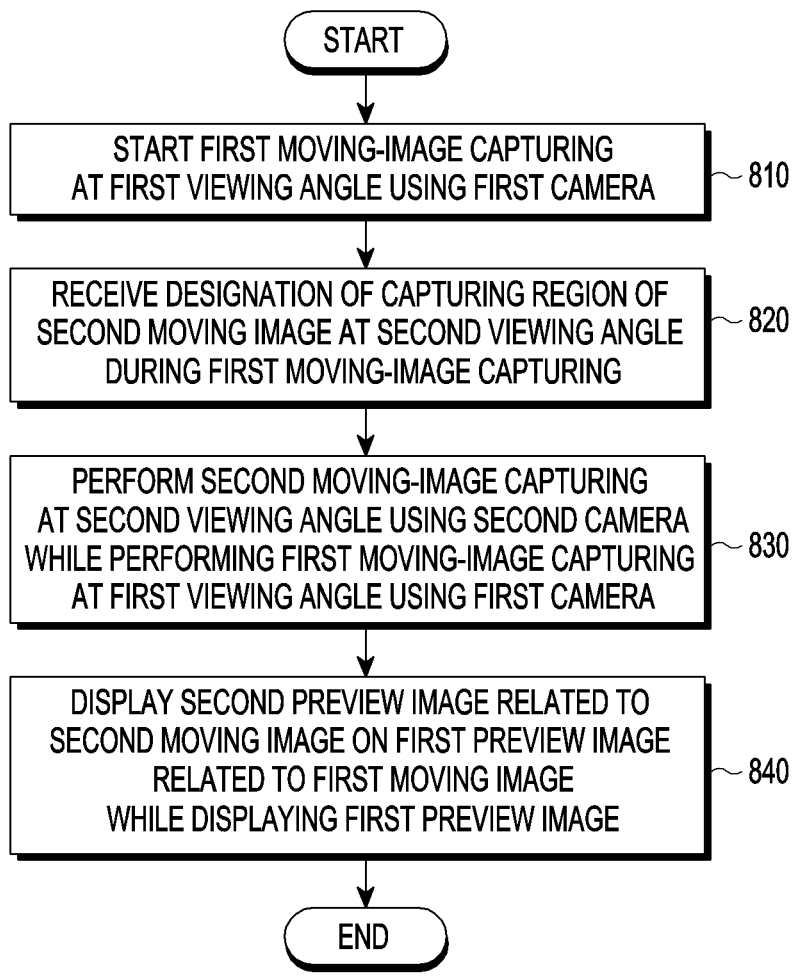
FIG. 8 is a flowchart of an operation method of an electronic device according to various embodiments.
Figure 9:
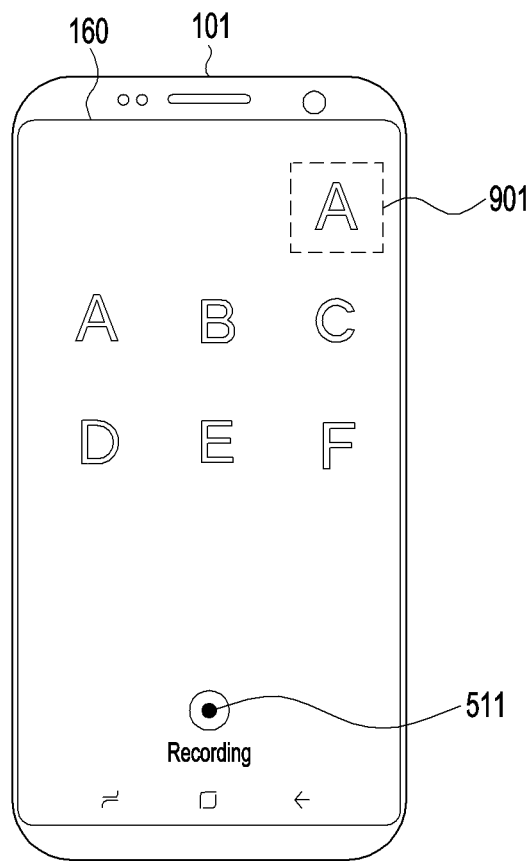
FIG. 9 is a diagram of an electronic device according to various embodiments of the disclosure.

FIG. 8 is a flowchart of an operation method of an electronic device according to various embodiments. The embodiment shown in FIG. 8 is described in greater detail with reference to FIG. 9. FIG. 9 is a diagram of an electronic device according to various embodiments of the disclosure.

In operation 810, the electronic device 101 according to various embodiments may start the first moving-image capturing at the first viewing angle by using the first camera. In operation 820, the electronic device 101 may receive designation of a capturing region of the second moving image at the second viewing angle during the first moving-image capturing. In operation 830, the electronic device 101 may perform the second moving-image capturing at the second viewing angle by using the second camera while performing the first moving-image capturing at the first viewing angle by using the first camera. In operation 840, the electronic device 101 may display a second preview image related to the second moving image on a first preview image related to the first moving image while displaying the first preview image. For example, as shown in FIG. 9, the electronic device 101 may display the image obtained by the first camera as a first preview image 902 on the touchscreen 160. The electronic device 101 may display at least a part of the image obtained by the second camera as a second preview image 901 on the touchscreen 160. It would be easily understood by a person skilled in the art that there is no limitation in at least one of a size, a form, or a position of the second preview image 901.

Figure 10:
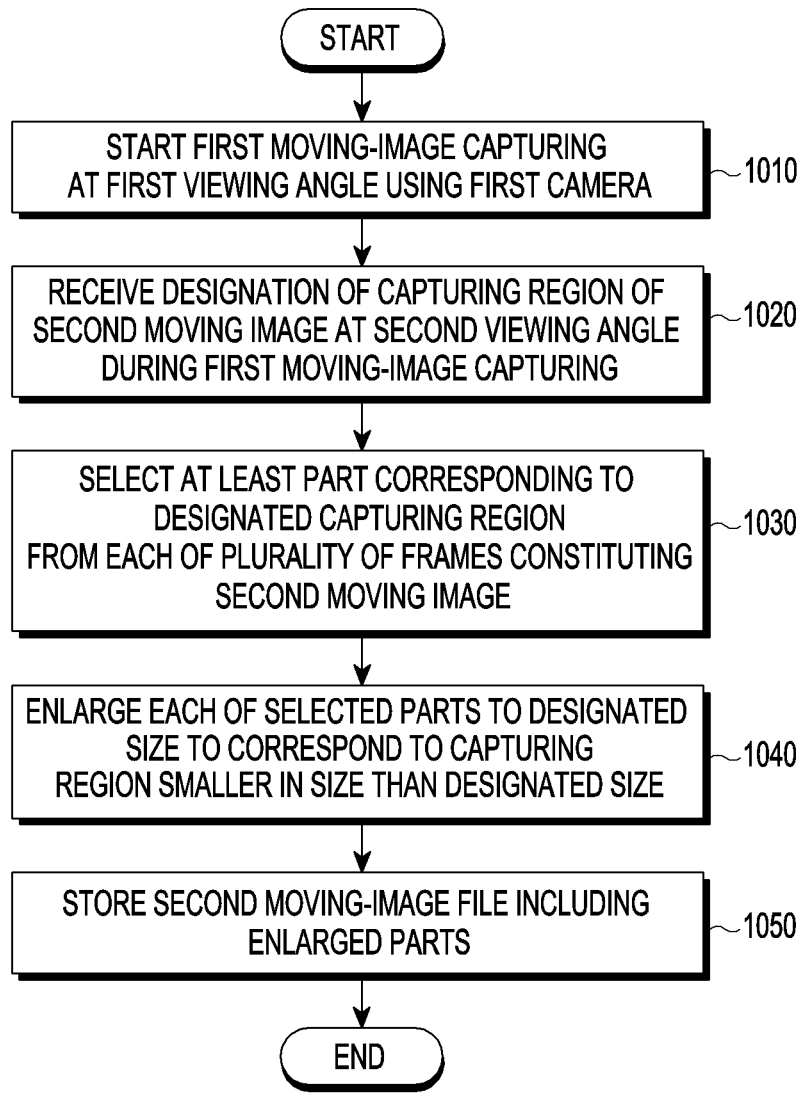
FIG. 10 is a flowchart of an operation method of an electronic device according to various embodiments.

FIG. 10 is a flowchart of an operation method of an electronic device according to various embodiments.

In operation 1010, the electronic device 101 according to various embodiments may start the first moving-image capturing at the first viewing angle by using the first camera. In operation 1020, the electronic device 101 may receive designation of a capturing region of the second moving image at the second viewing angle during the first moving-image capturing. In operation 1030, the electronic device 101 may select at least a part corresponding to the designated capturing region from each of a plurality of frames constituting the second moving image. In operation 1040, the electronic device 101 may enlarge each of the selected parts to a designated size to correspond to the capturing region that is smaller in size than the designated size. For example, as described with reference to FIG. 7D, the electronic device 101 may select some parts 783, 784, and 785 of the entire image 782 obtained by the second camera and store a moving image based on the selected parts. In this case, the selected parts may be smaller in size than the entire image. The electronic device 101 may enlarge the selected parts to a predesignated size and generate a moving-image file based on the enlarged parts. In operation 1050, the electronic device 101 may store a second moving-image file based on the enlarged parts.

Figure 11:
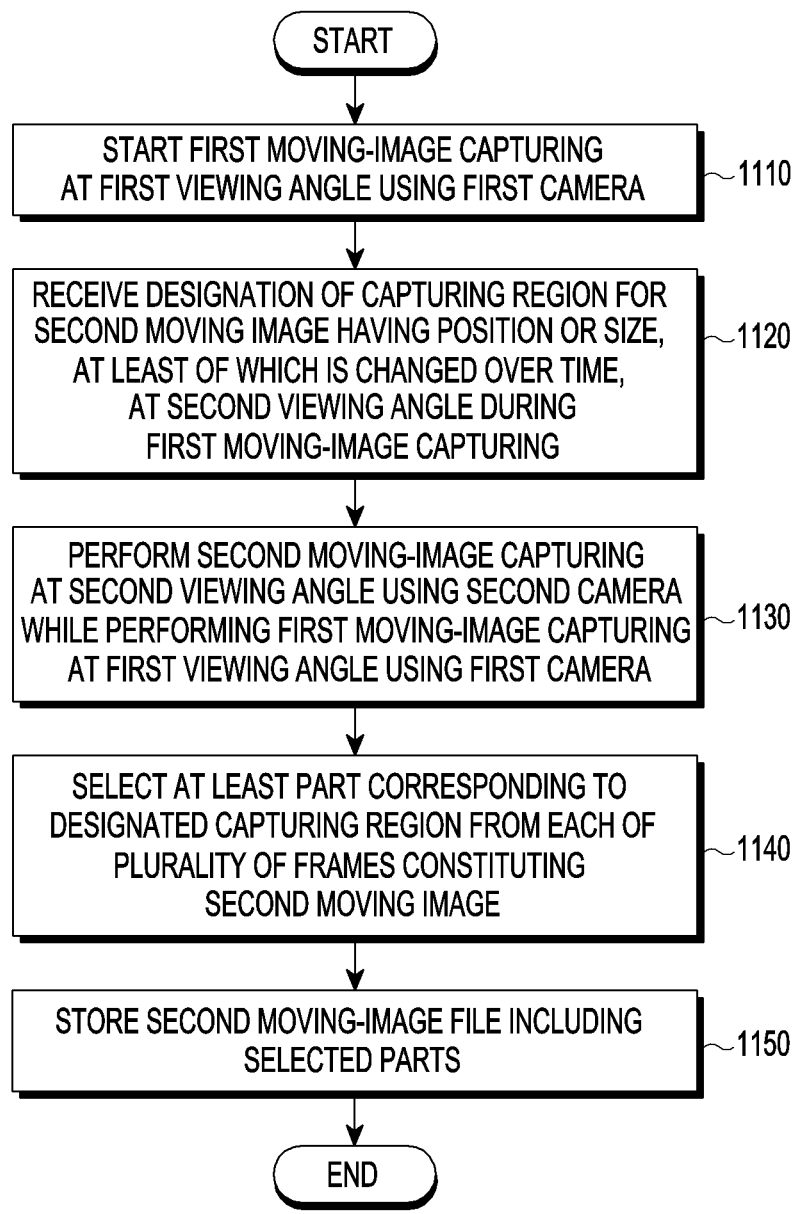
FIG. 11 is a flowchart of an operation method of an electronic device according to various embodiments.
Figure 12:
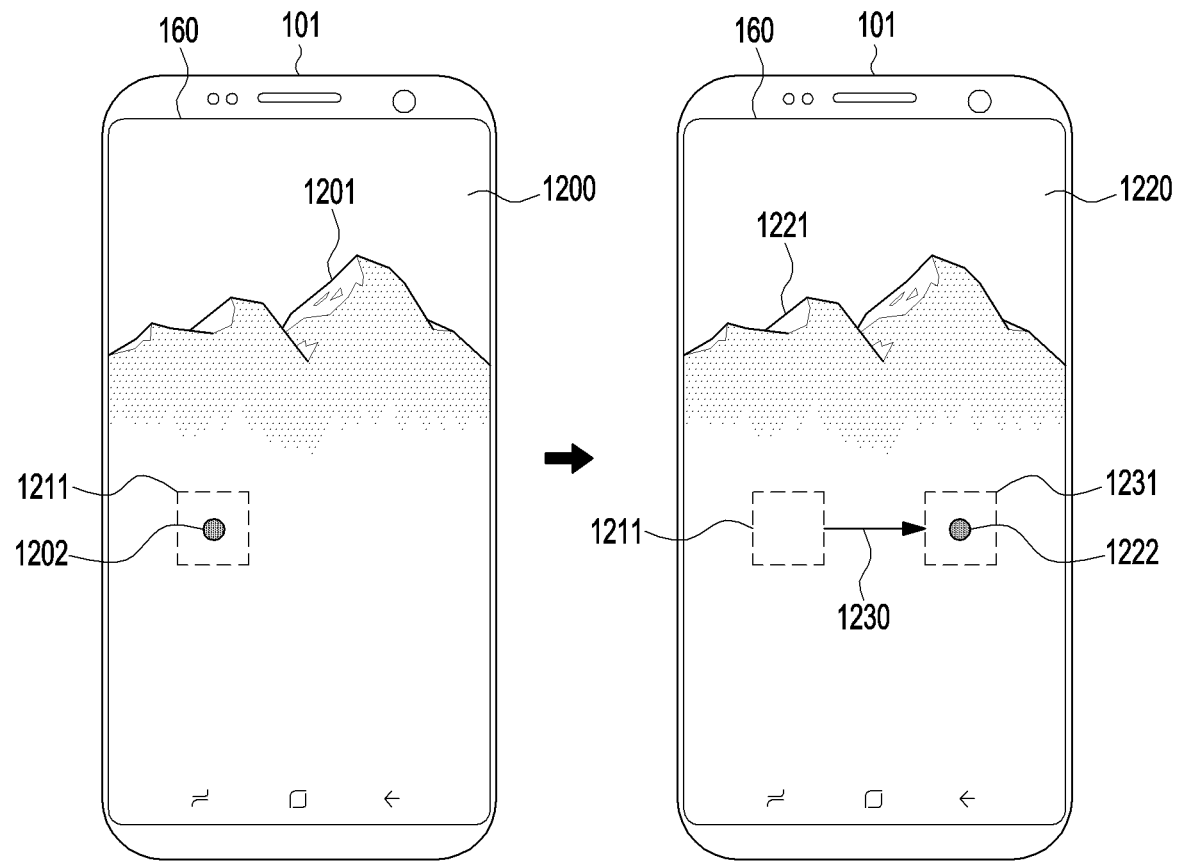
FIG. 12 is a diagram of an electronic device according to various embodiments of the disclosure.

FIG. 11 is a flowchart of an operation method of an electronic device according to various embodiments. The embodiment shown in FIG. 11 is described in greater detail with reference to FIG. 12. FIG. 12 is a diagram of an electronic device according to various embodiments of the disclosure.

In operation 1110, the electronic device 101 according to various embodiments may start the first moving-image capturing at the first viewing angle by using the first camera. In operation 1120, the electronic device 101 may receive designation of a capturing region of the second moving image having a position or a size, at least of which is changed over time, at the second viewing angle during the first moving-image capturing. For example, as shown in FIG. 12, the electronic device 101 may display a preview image 1200 on the touchscreen 160. The preview image 1200 may include an object 1201 corresponding to a mountain and an object 1211 corresponding to a ball. The electronic device 101 may receive designation of a region 1211 including the object 1202 corresponding to the ball as the capturing region for the second moving image. The electronic device 101 may then receive a command for movement 1230 of the capturing region during display of the preview image 1220. For example, as a position of an object 1222 corresponding to the ball displayed on the preview image 1220 is changed, the user may input the command for movement 1230 of the capturing region to a capturing region 1231. For example, the electronic device 101 may move the capturing region to the capturing region 1231 based on a drag input onto the touchscreen 160.

In operation 1130, the electronic device 101 may perform the second moving-image capturing at the second viewing angle by using the second camera while performing the first moving-image capturing at the first viewing angle by using the first camera. In operation 1140, the electronic device 101 may select at least a part corresponding to the designated capturing region from each of a plurality of frames constituting the second moving image. In operation 1150, the electronic device 101 may store a second moving-image file based on the selected parts. Thus, even when a subject in a scene moves, the electronic device 101 may generate and store the second moving image including an object corresponding to the subject. As described above, the electronic device 101 may move the capturing region to the capturing region 1231 in response to the user's input, but according to various embodiments, the electronic device 101 may self-move the capturing region as will be described in more detail with reference to FIG. 13.

Figure 13:
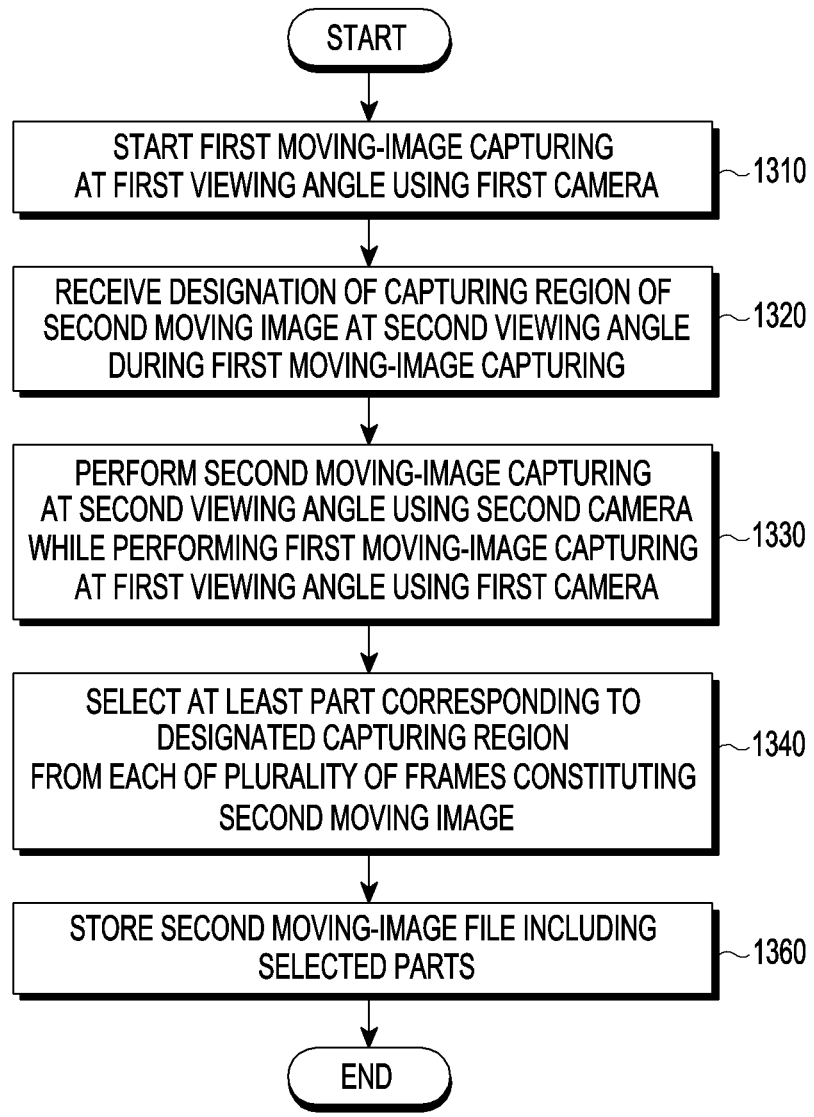
FIG. 13 is a flowchart of an operation method of an electronic device according to various embodiments.

FIG. 13 is a flowchart of an operation method of an electronic device according to various embodiments.

In operation 1310, the electronic device 101 according to various embodiments may start the first moving-image capturing at the first viewing angle by using the first camera. In operation 1320, the electronic device 101 may receive designation of a capturing region of the second moving image at the second viewing angle during the first moving-image capturing. For example, the electronic device 101 may identify the capturing region in response to user's designation or automatically. For example, upon detecting a designated object based on image analysis of a preview image, the electronic device 101 may identify a region including the object as the capturing region. In operation 1330, the electronic device 101 may perform the second moving-image capturing at the second viewing angle by using the second camera while performing the first moving-image capturing at the first viewing angle by using the first camera. In operation 1340, the electronic device 101 may detect a change in at least one of a position or a size of the object included in the capturing region and change at least one of a position or a size of the capturing region correspondingly. For example, as shown in FIG. 12, during capturing of the first image and the second image, the ball in the scene may be moved to the right. The electronic device 101 may identify the object 1202 of the ball included in the capturing region 1211 of the preview image 1200. The electronic device 101 may determine that the position of the identified object 1202 of the ball is changed. The electronic device 101 may also automatically change the capturing region as the change in the position of the object 1202. The electronic device 101 may change the capturing region by tracking the object by using existing various object tracking schemes. In operation 1350, the electronic device 101 may select at least a part corresponding to the designated capturing region from each of a plurality of frames constituting the second moving image. The electronic device 101 may change at least one of the position, the size, or the form of the capturing region to include at least some of objects included in an initial capturing region. In operation 1360, the electronic device 101 may store a second moving-image file based on the selected parts.

Figure 14:
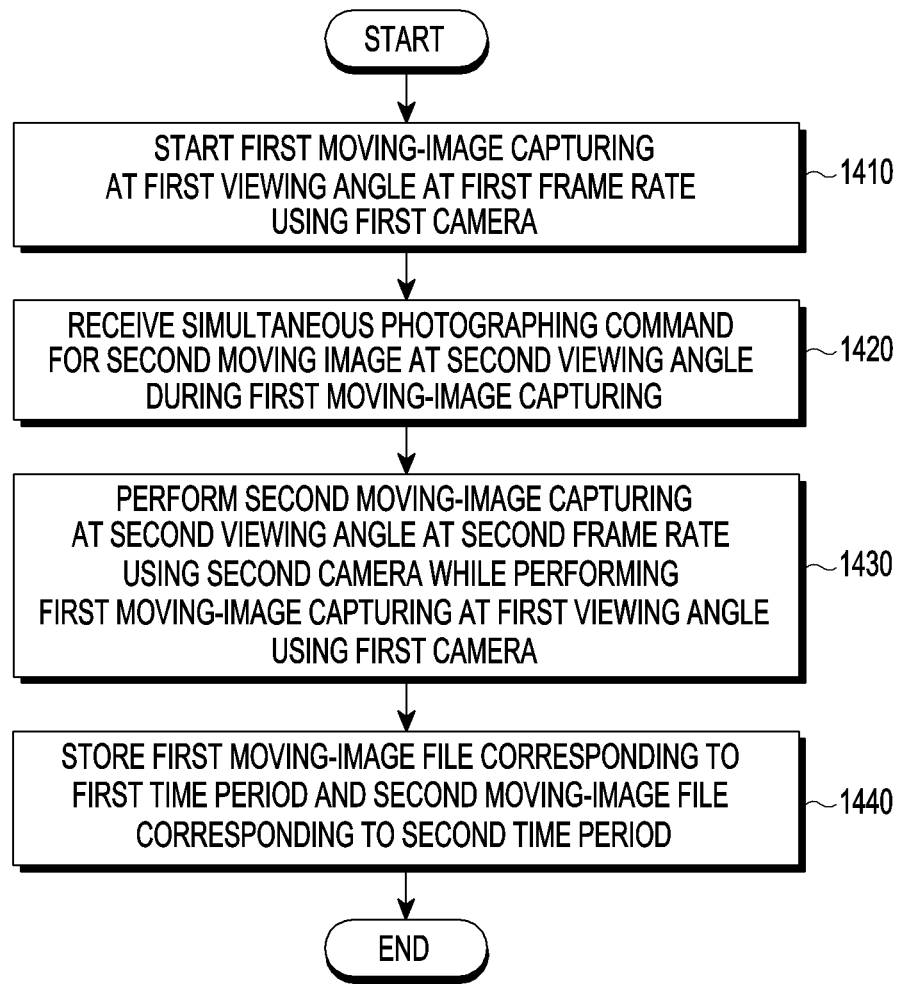
FIG. 14 is a flowchart of an operation method of an electronic device according to various embodiments.
Figure 15:
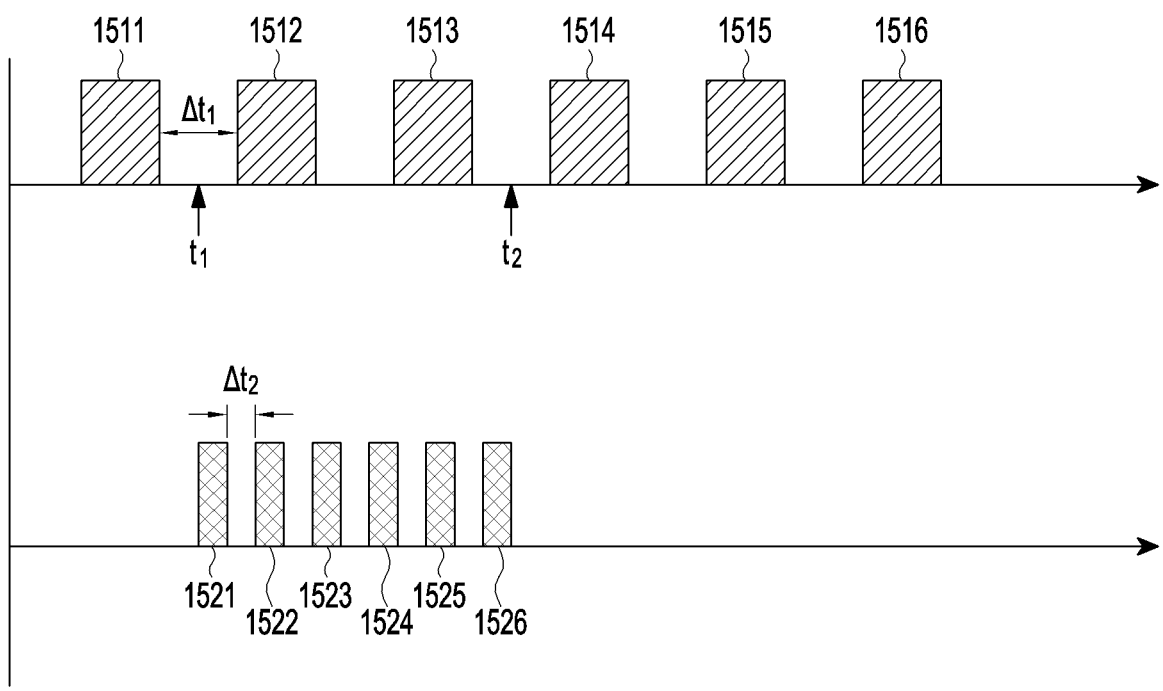
FIG. 15 is a diagram showing a frame captured by an electronic device according to various embodiments.

FIG. 14 is a flowchart of an operation method of an electronic device according to various embodiments. The embodiment shown in FIG. 14 is described in greater detail with reference to FIG. 15. FIG. 15 is a diagram showing a frame captured by an electronic device according to various embodiments.

In operation 1410, the electronic device 101 according to various embodiments may start the first moving-image capturing at the first viewing angle at a first frame rate by using the first camera. For example, as shown in FIG. 15, the electronic device 101 may obtain and store a plurality of first image frames 1511 through 1516 at first time intervals $\Delta t_1$ by using the first camera. In operation 1420, the electronic device 101 may receive a simultaneous photographing command for capturing of a second moving image at a second viewing angle during the first moving-image capturing. In operation 1430, the electronic device 101 may perform the second moving-image capturing at the second viewing angle at a second frame rate by using the second camera while performing the first moving-image capturing at the first viewing angle by using the first camera. For example, as shown in FIG. 15, the electronic device 101 may obtain and store a plurality of second image frames 1521 through 1526 at second time intervals $\Delta t_2$ by using the second camera. That is, the frame rate of the first camera and the frame rate of the second camera may be set differently. In operation 1440, the electronic device 101 may store a first moving-image file corresponding to a first time period and a second moving-image file corresponding to a second time period. As the frame rate of the second moving image is higher than that of the first moving image, the second moving image may be displayed like a slow motion. Thus, the electronic device 101 may store the entire image as a general moving image and store a moving image of a slow motion for a part corresponding to a specific time period of a duration of the entire image.

Figure 16:
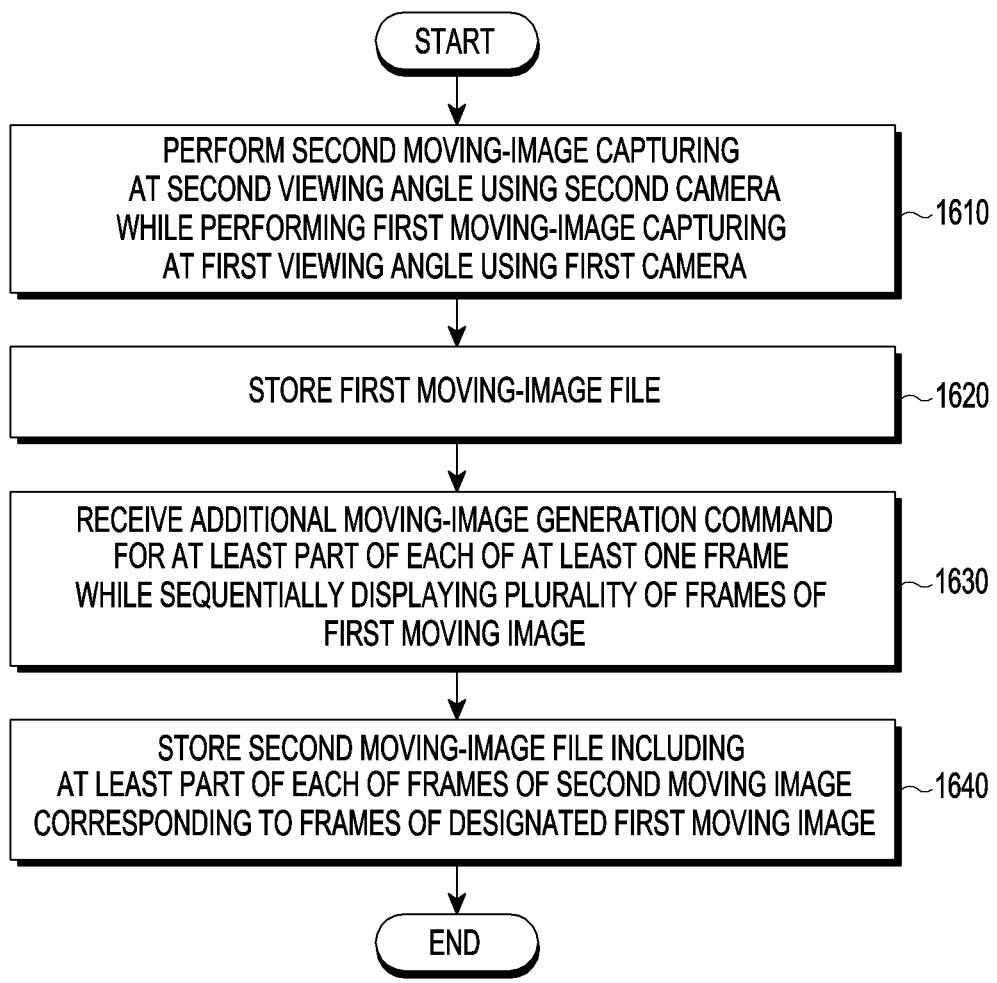
FIG. 16 is a flowchart of an operation method of an electronic device according to various embodiments.
Figure 17:
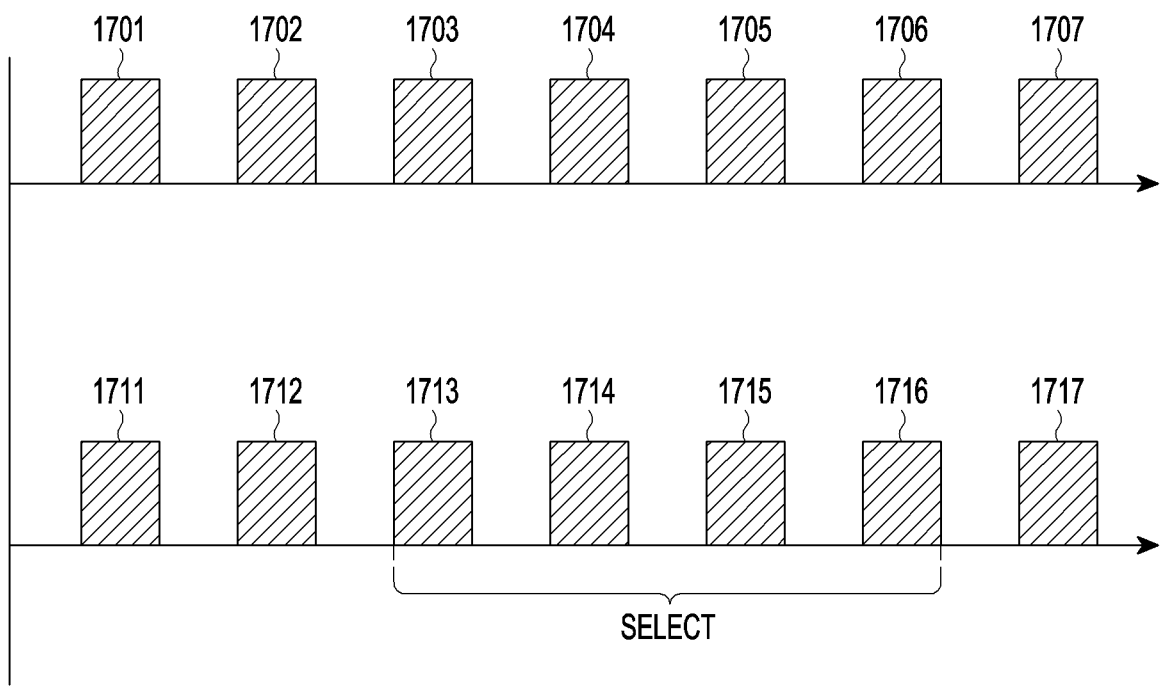
FIG. 17 is a diagram showing a frame captured by an electronic device according to various embodiments.

FIG. 16 is a flowchart of an operation method of an electronic device according to various embodiments. The embodiment of FIG. 16 will be described in more detail with reference to FIG. 17. FIG. 17 is a diagram showing a frame captured by an electronic device according to various embodiments.

In operation 1610, the electronic device 101 according to various embodiments may perform the second moving-image capturing at the second viewing angle by using the second camera while performing the first moving-image capturing at the first viewing angle by using the first camera. The electronic device 101 may receive a first moving-image capturing command for photographing at the first viewing angle using the first camera in the first photographing mode. The electronic device 101 may obtain a plurality of first image frames 1701 through 1707 by using the first camera, as shown in FIG. 17. Even when receiving the moving-image capturing command at the first viewing angle, the electronic device 101 may drive the second camera to perform the second moving-image capturing at the second viewing angle. Thus, the electronic device 101 may obtain a plurality of second image frames 1711 through 1717 by using the second camera, as shown in FIG. 17. In operation 1620, the electronic device 101 may store the first moving-image file. Moreover, the electronic device 101 may temporarily store at least one of the plurality of second image frames 1711 through 1717 obtained by using the second camera to constitute the second moving image. In operation 1630, the electronic device 101 may receive an additional moving-image generation command for at least a part of each of at least one frame while sequentially displaying a plurality of frames of the first moving image. For example, the electronic device 101 may sequentially display the plurality of frames of the first moving image in response to a request for reproducing the stored first moving image. The user may designate a capturing region for generating the second moving image through the touchscreen while watching the first moving image. For example, according to various schemes described with reference to FIGS. 7A through 7C, the electronic device 101 may receive designation of the capturing region for generating the second moving image. In operation 1640, the electronic device 101 may store a second moving-image file based on at least a part of each of frames of the second moving image corresponding to frames of the designated first moving image. The electronic device 101 may generate the second moving-image file based on second image frames 1713 through 1716 corresponding to a selected time period and store the generated second moving-image file in the memory 130. Thus, the electronic device 101 may generate the first moving image corresponding to the first viewing angle and the second moving image corresponding to at least a partial time period of the first moving image and store the first moving image and the second moving image.

Figure 18:
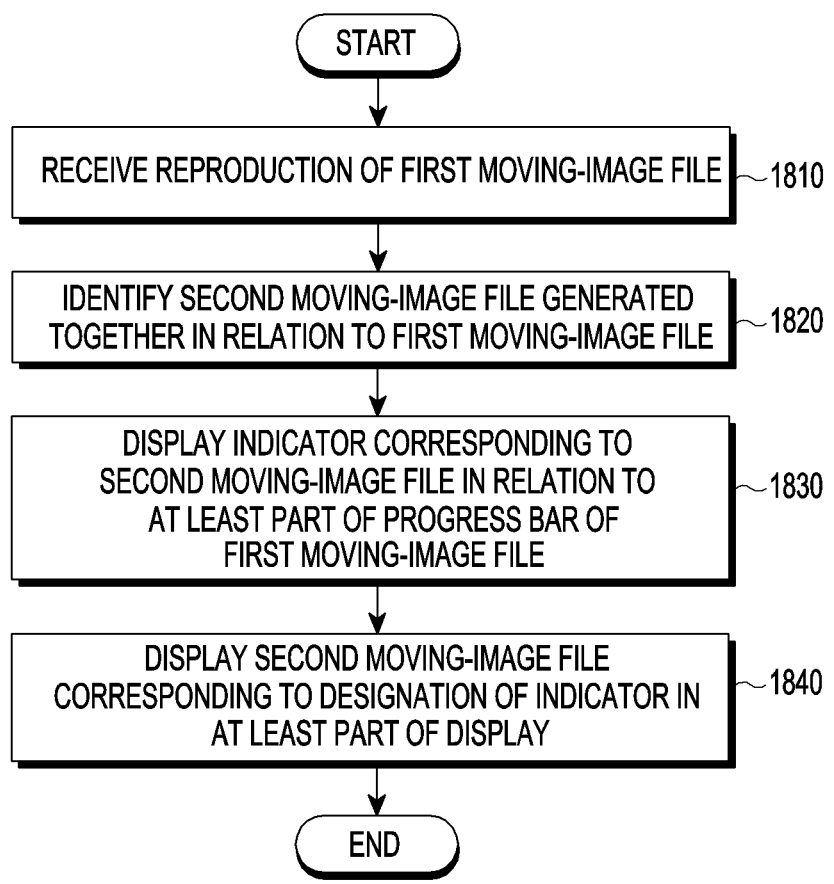
FIG. 18 is a flowchart of an operation method of an electronic device according to various embodiments.
Figure 19:
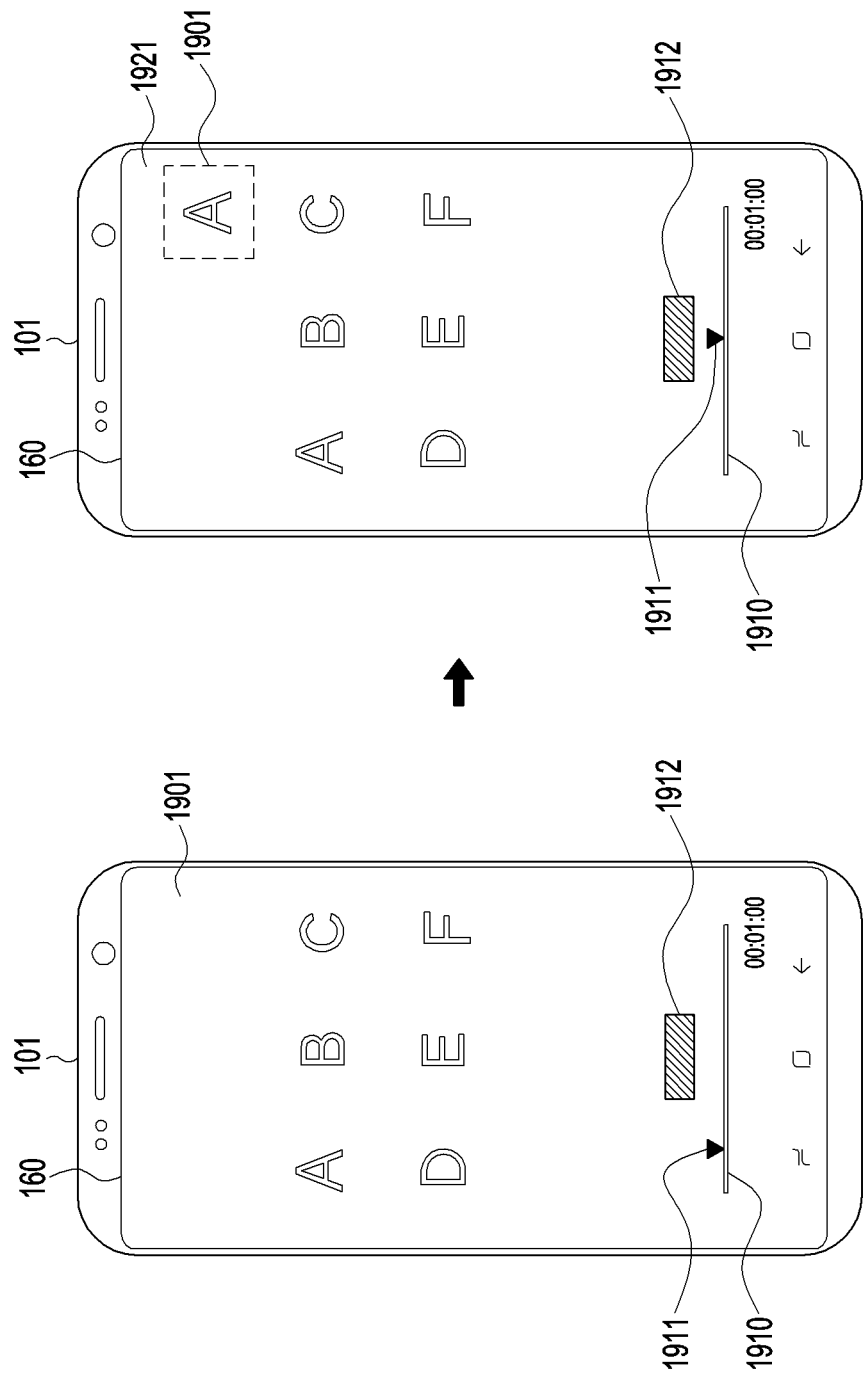
FIG. 19 is a diagram showing a frame captured by an electronic device according to various embodiments.

FIG. 18 is a flowchart of an operation method of an electronic device according to various embodiments. The embodiment shown in FIG. 18 is described in greater detail with reference to FIG. 19. FIG. 19 is a diagram showing a frame captured by an electronic device according to various embodiments.

In operation 1810, the electronic device 101 according to various embodiments may receive reproduction for the first moving-image file. In the current embodiment, the electronic device 101 is assumed to have stored a first moving-image file of a first time length and a second moving-image file of a second time length corresponding to at least a partial time period of the first moving-image file. Upon detecting an execution command for a gallery application, the electronic device 101 may display a thumbnail image of at least one stored moving-image file. Upon detecting reproduction of a particular moving-image file, the electronic device 101 may reproduce the particular moving-image file. In operation 1820, the electronic device 101 may identify the second moving-image file generated together in relation to the first moving-image file. According to various embodiments, upon receiving a simultaneous photographing command, the electronic device 101 may generate the first moving-image file and the second moving-image file and store the first moving-image file and the second moving-image file in relation to each other. In operation 1830, the electronic device 101 may display an indicator corresponding to the second moving-image file in relation to at least a part of a progress bar of the first moving-image file. For example, as shown in FIG. 19, the electronic device 101 may display a first image 1901 constituting a moving image on the touchscreen 160. The electronic device 101 may display a progress bar 1910 and an indicator 1911 to indicate a reproduction progress of the moving image. Upon detection of a request for displaying the progress bar 1910 and the indicator 1911, the electronic device 101 may display only a specific time. The electronic device 101 may display an indicator 1912 indicating whether the second moving image is positioned in a part corresponding to at least a part of the progress bar 1910. In operation 1840, the electronic device 101 may display the second moving-image file on at least a part of the touchscreen 160 to correspond to designation of the indicator 1912. For example, as shown in FIG. 19, the electronic device 101 may display an image 1921 constituting the first moving image and an image 1922 constituting the second moving image on the image 1921 over time. Thus, the electronic device 101 may simultaneously reproduce the first moving image and the second moving image. The electronic device 101 may display the second moving image on the entire screen upon detection of designation of the image 1922, and in this case, may display the first moving image on a relatively small window. According to various embodiments, even in the absence of designation of the indicator, upon reproduction of a time period in which the second moving image exists, the electronic device 101 may simultaneously reproduce the first moving image and the second moving image by automatically displaying the second moving image on a relatively small window.

What is claimed is:

1. An electronic device comprising:
a first camera corresponding to a first angle of view;
a second camera corresponding to a second angle of view wider than the first angle of view;
a processor electrically connected to the first camera and the second camera;
a touchscreen electrically connected to the processor; and
a memory electrically connected to the processor,
wherein the processor is configured to:
obtain a first start command for capturing a first moving image,
in response to obtaining of the first start command, store, in the memory, the first moving image based on a plurality of first image frames obtained using the first camera while displaying the plurality of first image frames on the touchscreen;
identify, through the touchscreen, a first capturing region during capturing of the first moving image, the first capturing region including a first object included in at least one image frame among the plurality of first image frames,
obtain a second start command for capturing a second moving image including the first capturing region using the second camera,
in response to obtaining of the second start command, store, in the memory, the second moving image based on a plurality of second image frames including the first capturing region obtained using the second camera during capturing of the first moving image, the plurality of second image frames comprising the first object captured using the second camera,
detect a change in position of the first object in the plurality of first image frames during capturing of the first moving image,
based on detecting the change in position of the first object, control to change the first capturing region of the second moving image to a second capturing region including the first object according to the change in the position, and
control the second camera to capture the second moving image in the second capturing region.

2. The electronic device of claim 1, wherein the processor is configured to:
receive a command for identifying the first capturing region included in the second moving image through the touchscreen; and
select parts corresponding to the first capturing region respectively from the plurality of second image frames to generate the second moving image based on the selected parts.

3. The electronic device of claim 2, wherein the processor is configured to:
upon detecting a touch in a first position of the touchscreen, display a guideline having default form and size to correspond to the first position;
change at least one of a form or a size of the guideline when a pressure of the touch in the first position increases to a threshold value or higher; and
select, as the first capturing region, parts corresponding to a region included in the guideline respectively from the plurality of second image frames.

4. The electronic device of claim 2, wherein the processor is configured to:
upon detecting a touch in a first position of the touchscreen, display a guideline having default form and size to correspond to the first position;
change at least one of a form or a size of the guideline upon detecting a change in a position of the touch on the touchscreen; and
select, as the first capturing region, parts corresponding to a region included in the guideline respectively from the plurality of second image frames.

5. The electronic device of claim 2, wherein the processor is configured to:
detect a touch moving from a first position on the touchscreen to a second position on the touchscreen; and
select the first capturing region based at least on a moving path of the touch.

6. The electronic device of claim 1, wherein the processor is configured to:
receive a command for identifying the first capturing region included in the second moving image through the touchscreen;
select parts corresponding to the first capturing region respectively from the plurality of second image frames to enlarge the selected parts to a preset size; and
generate the second moving image based on the enlarged parts.

7. The electronic device of claim 1, wherein the processor is configured to:
receive a command for changing the first capturing region included in the second moving image when at least one of a position, a size, or a form of the first capturing region is changed over time, through the touchscreen; and
based on the command for changing the first capturing region included in the second moving image, select parts corresponding to the second capturing region respectively from the plurality of second image frames to generate the second moving image based on the selected parts.

8. The electronic device of claim 1, wherein the processor is configured to:
- identify the second capturing region by changing at least one of a position, a size, or a form of the first capturing region included in the second moving image to correspond to the change in the position of the first object; and
- select parts corresponding to the second capturing region respectively from the plurality of second image frames to generate the second moving image based on the selected parts.

9. The electronic device of claim 1, wherein the processor is configured to display at least some of the plurality of second image frames on the first image frame while displaying the plurality of first image frames on the touchscreen.

10. An operation method of an electronic device comprising a first camera corresponding to a first angle of view and a second camera corresponding to a second angle of view wider than the first angle of view, the operation method comprising:
- obtaining a first start command for capturing a first moving image;
- in response to obtaining of the first start command, storing, in a memory of the electronic device, the first moving image based on a plurality of first image frames obtained using the first camera while displaying the plurality of first image frames;
- identifying a first capturing region during capturing of the first moving image, the first capturing region including a first object included in at least one image frame among the plurality of first image frames;
- obtaining a second start command for capturing a second moving image including the first capturing region using the second camera;
- in response to obtaining of the second start command, storing, in the memory, the second moving image based on a plurality of second image frames including the first capturing region obtained using the second camera during capturing of the first moving image, the plurality of second image frames comprising the first object captured using the second camera;
- detecting a change in position of the first object in the plurality of first image frames during capturing of the first moving image;
- based on detecting the change in position of the first object, controlling to change the first capturing region of the second moving image to a second capturing region including the first object according to the change in the position; and
- controlling the second camera to capture the second moving image in the second capturing region.

11. The operation method of claim 10, further comprising:
- receiving a command for identifying the first capturing region included in the second moving image; and
- selecting parts corresponding to the first capturing region respectively from the plurality of second image frames to generate the second moving image based on the selected parts.

12. The operation method of claim 11, wherein the receiving of the command for identifying the first capturing region of the second moving image comprises:
- upon detecting a touch in a first position of a touchscreen of the electronic device, displaying a guideline having default form and size to correspond to the first position;
- changing at least one of a form or a size of the guideline when a pressure of the touch in the first position increases to a threshold value or higher; and
- selecting, as the first capturing region, parts corresponding to a region included in the guideline respectively from the plurality of second image frames.

13. The operation method of claim 11, wherein the receiving of the designation of the capturing region of the second moving image comprises:
- upon detecting a touch in a first position of a touchscreen of the electronic device, displaying a guideline having default form and size to correspond to the first position;
- changing at least one of a form or a size of the guideline upon detecting a change in a position of the touch on the touchscreen; and
- selecting, as the first capturing region, parts corresponding to a region included in the guideline respectively from the plurality of second image frames.

14. The operation method of claim 11, wherein the receiving of the designation of the capturing region of the second moving image comprises:
- detecting a touch moving from a first position on a touchscreen of the electronic device to a second position on the touchscreen; and
- selecting the first capturing region based at least on a moving path of the touch.

15. The operation method of claim 10, further comprising:
- receiving a command for identifying the first capturing region included in the second moving image;
- selecting parts corresponding to the first capturing region respectively from the plurality of second image frames to enlarge the selected parts to a preset size; and
- generating the second moving image based on the enlarged parts.

16. The operation method of claim 10, further comprising:
- receiving a command for changing the first capturing region included in the second moving image when at least one of a position, a size, or a form of the first capturing region is changed over time; and
- based on the command for changing the first capturing region included in the second moving image, selecting parts corresponding to the second capturing region respectively from the plurality of second image frames to generate the second moving image based on the selected parts.

17. The operation method of claim 10, further comprising:
- identifying the second capturing region by changing at least one of a position, a size, or a form of the first capturing region included in the second moving image to correspond to the change in the position of the first object; and
- selecting parts corresponding to the second capturing region respectively from the plurality of second image frames to generate the second moving image based on the selected parts.

18. The operation method of claim 10, wherein the displaying of the plurality of first image frames obtained using the first camera comprises displaying at least some of the plurality of second image frames on the first image frame while displaying the plurality of first image frames.

19. The operation method of claim 10, wherein a frame rate of the first moving image is the same as or different from a frame rate of the second moving image.

* * * * *